Nov. 6, 1923.
E. G. LOOMIS
COMB CUTTING MACHINE
Original Filed March 1, 1920

Inventor
EVARTS G. LOOMIS
By his Attorneys
Southgate & Southgate

Nov. 6, 1923.

E. G. LOOMIS 1,473,111

COMB CUTTING MACHINE

Original Filed March 1, 1920     18 Sheets-Sheet 6

Inventor
EVARTS G. LOOMIS
By his Attorneys
Southgate & Southgate

Nov. 6, 1923.  
E. G. LOOMIS  
1,473,111  
COMB CUTTING MACHINE  
Original Filed March 1, 1920  18 Sheets-Sheet 8

Inventor  
EVARTS G. LOOMIS  
By his Attorneys  
Southgate & Southgate

Nov. 6, 1923.  1,473,111
E. G. LOOMIS
COMB CUTTING MACHINE
Original Filed March 1, 1920    18 Sheets-Sheet 9

Inventor
EVARTS G. LOOMIS
By his Attorneys
Southgate & Southgate

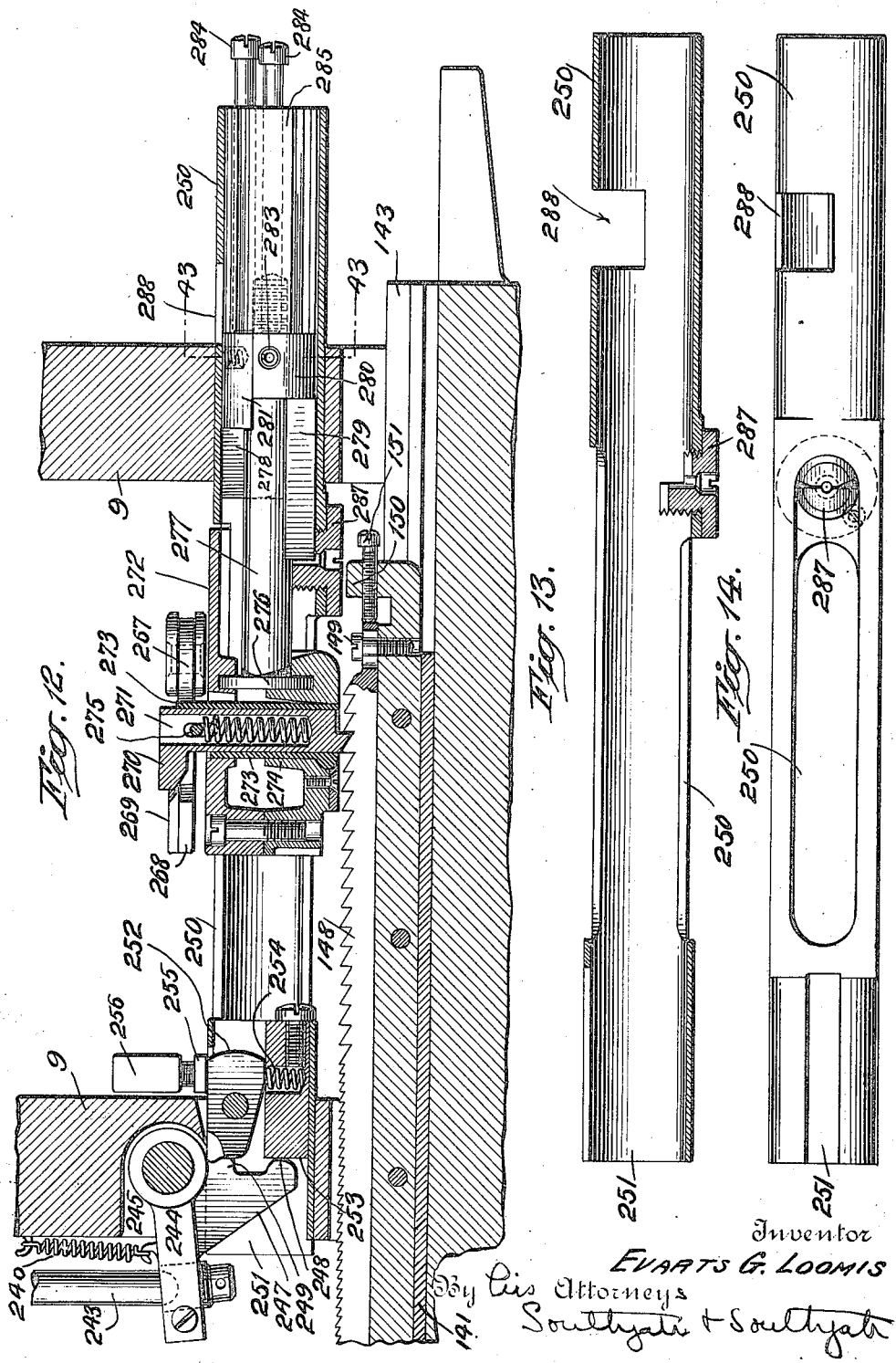

Nov. 6, 1923.
E. G. LOOMIS
1,473,111
COMB CUTTING MACHINE
Original Filed March 1, 1920   18 Sheets-Sheet 11
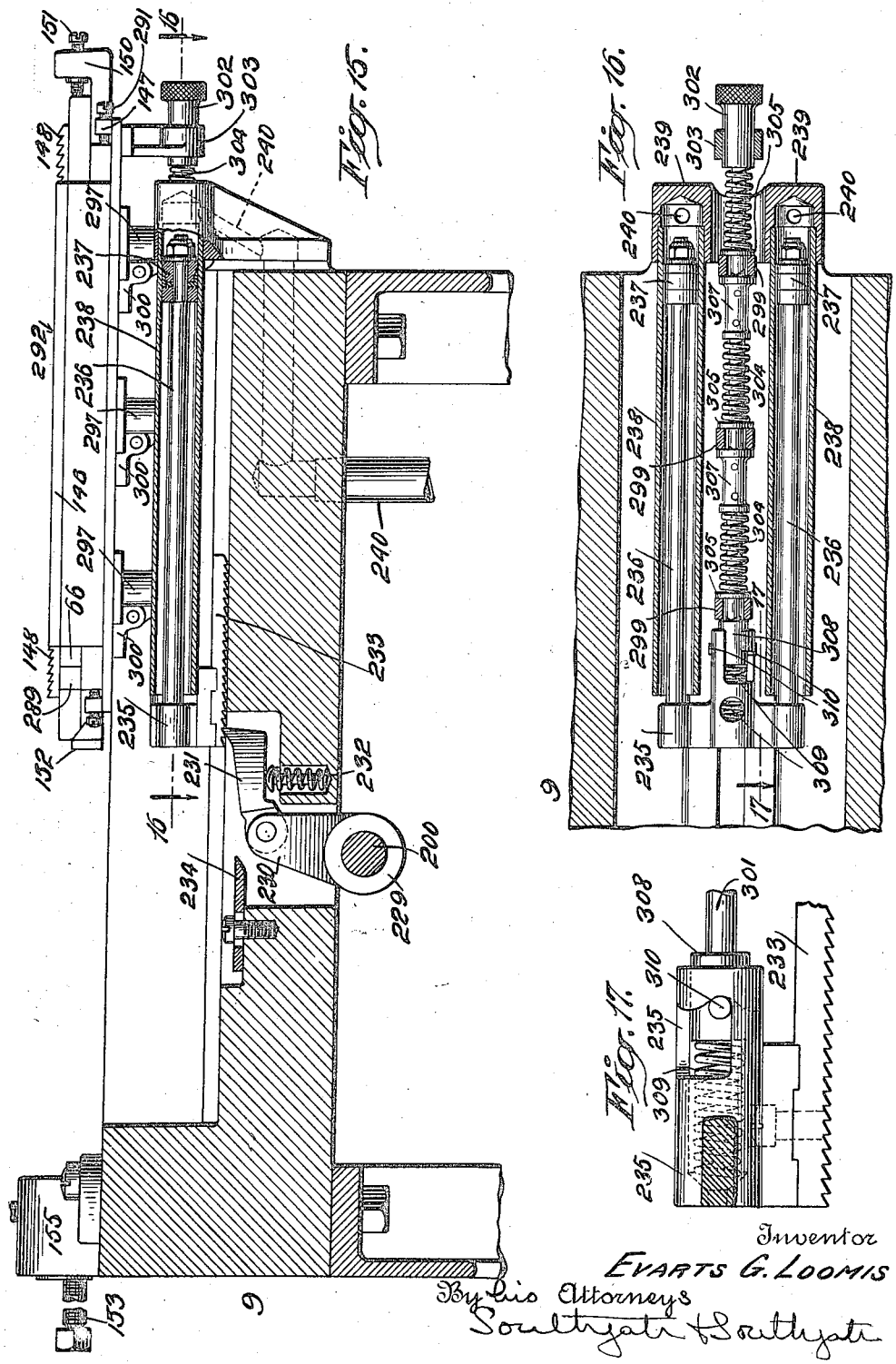
Inventor
EVARTS G. LOOMIS
By his Attorneys
Southgate & Southgate

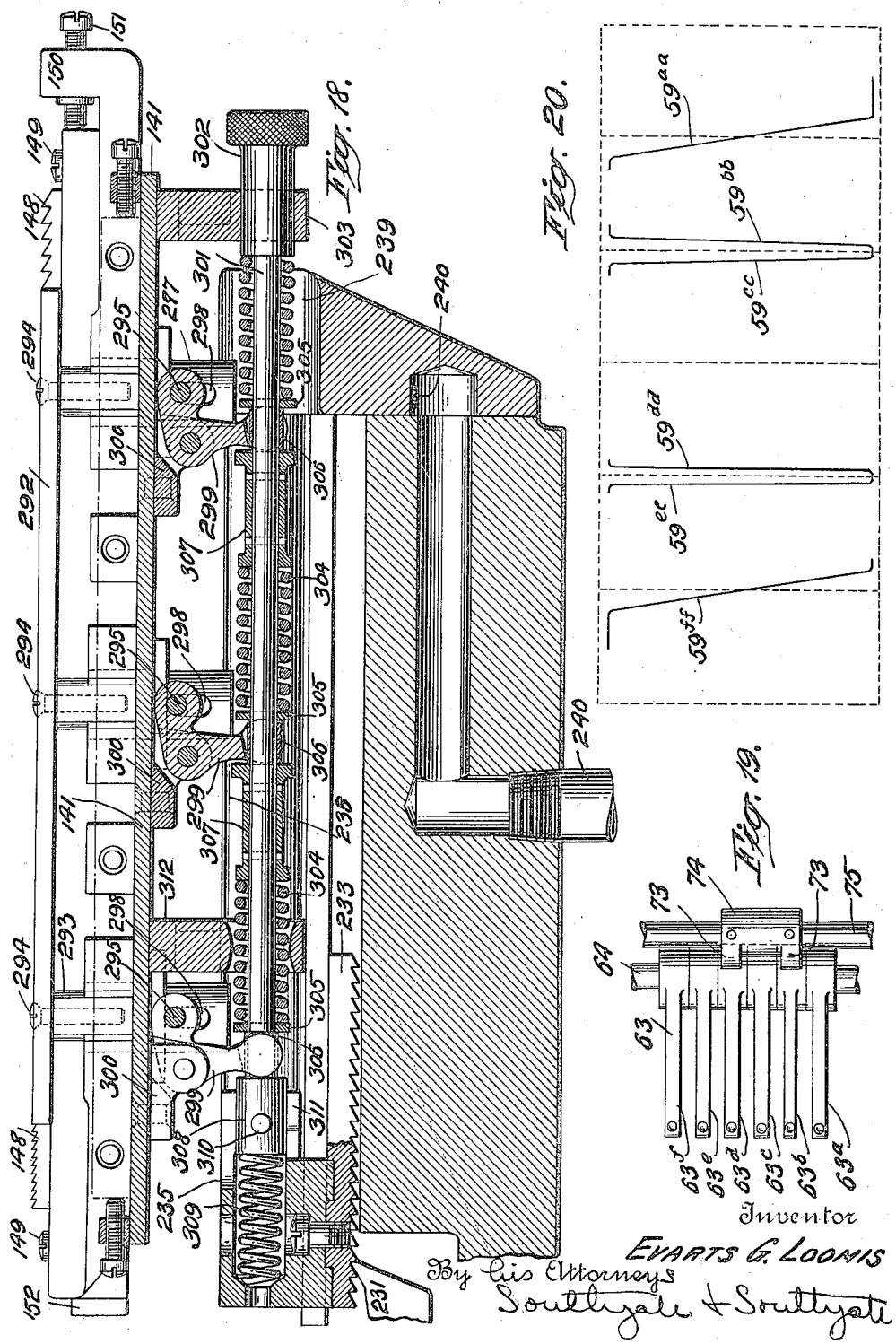

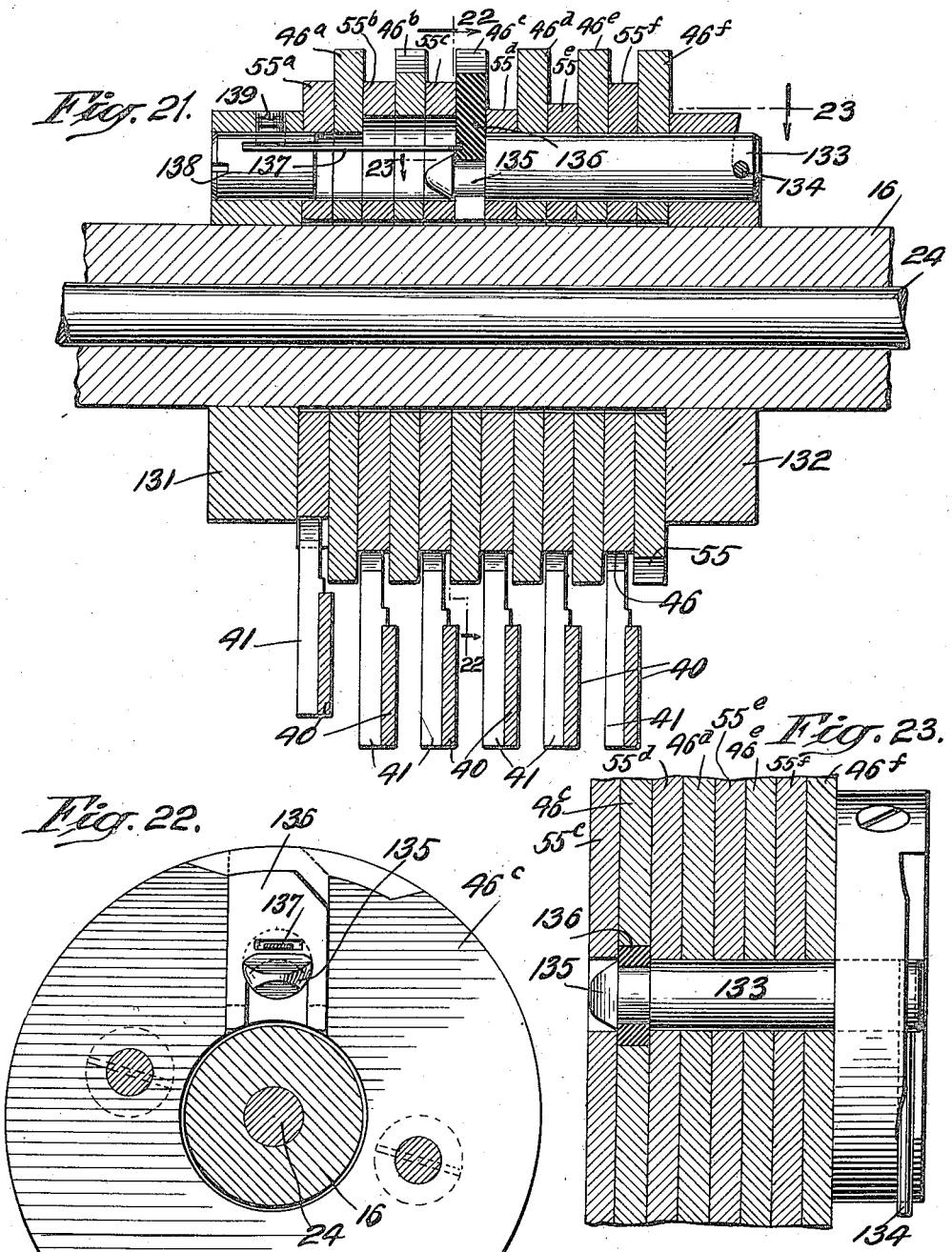

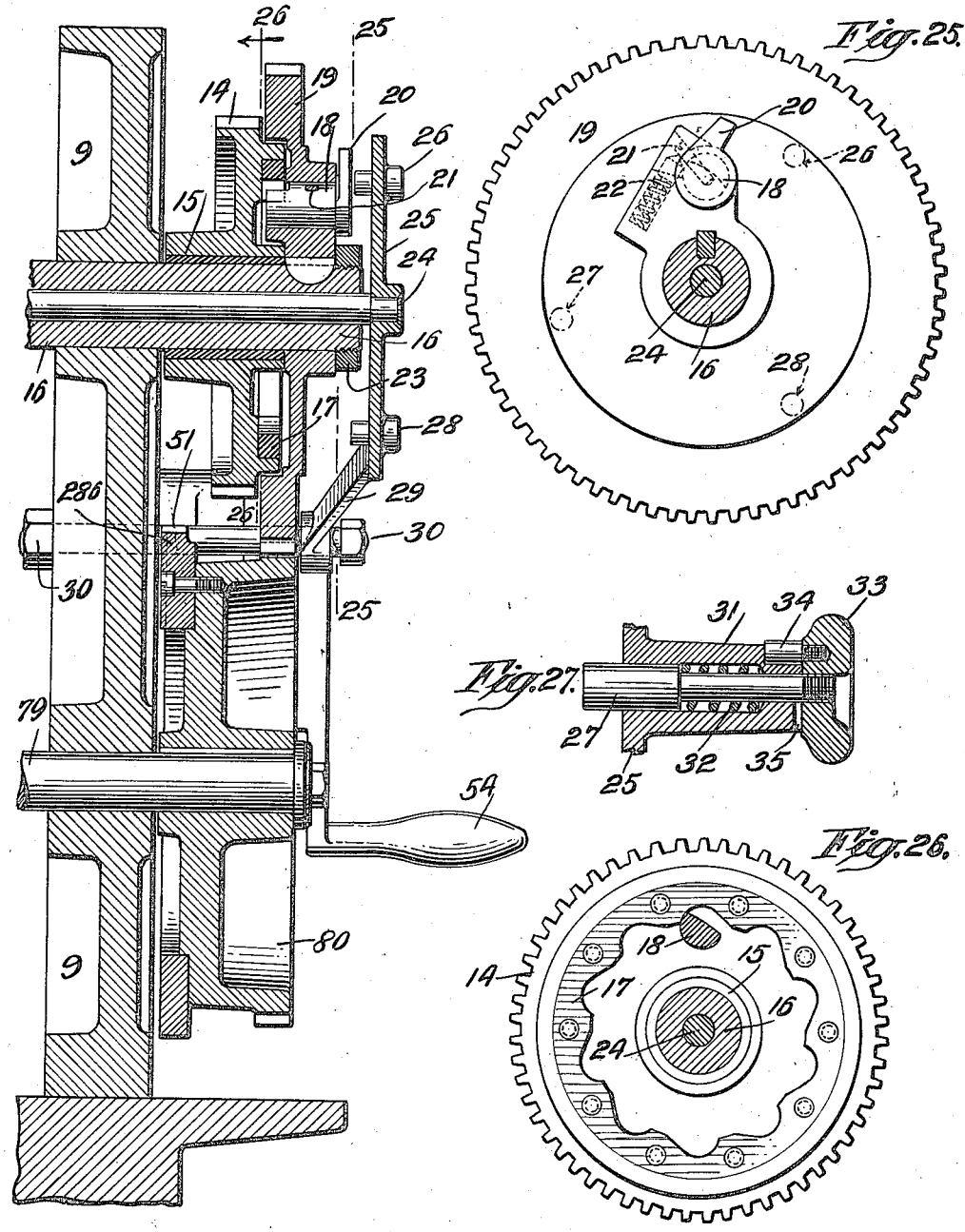

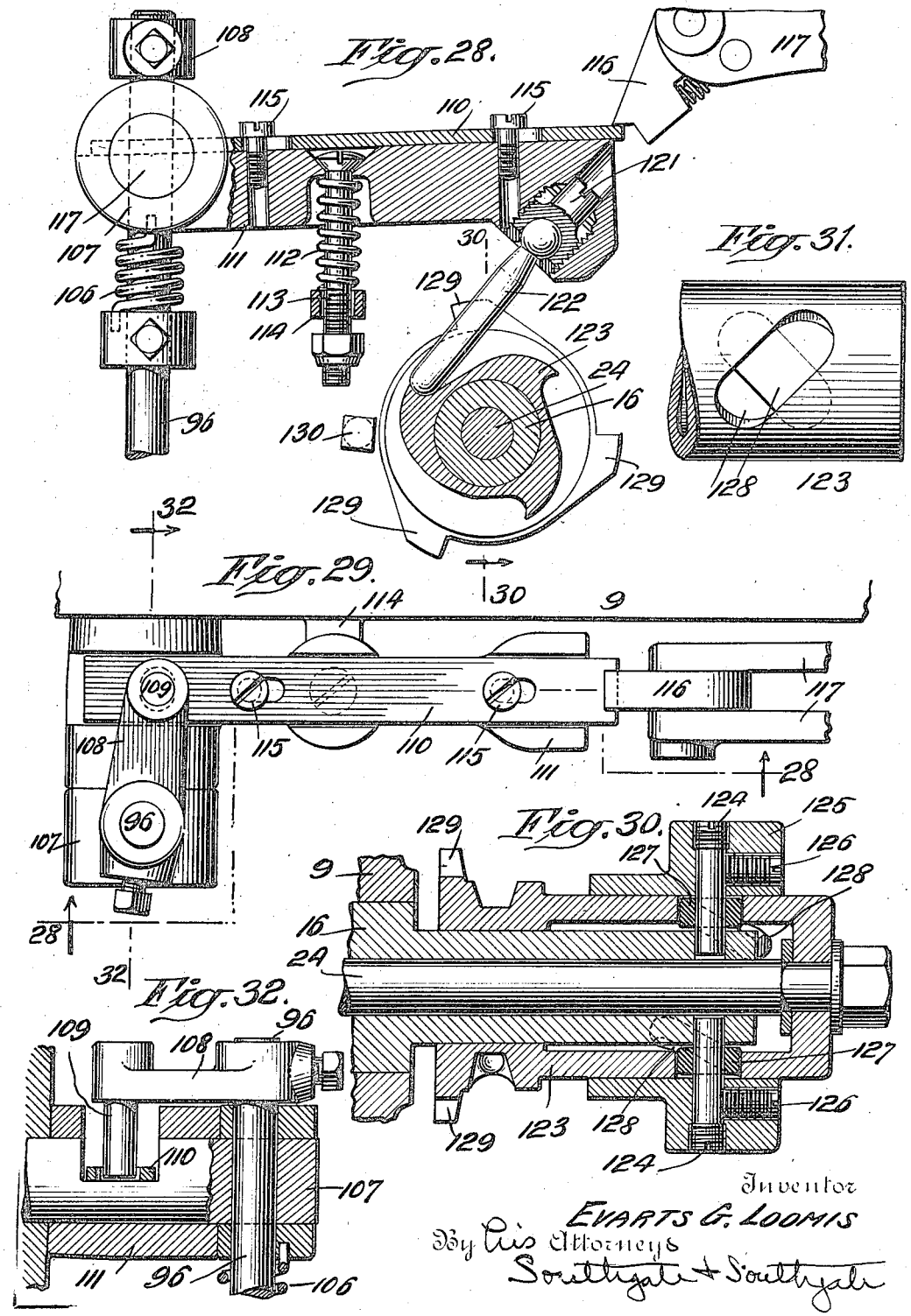

Nov. 6, 1923.                                              1,473,111
                          E G. LOOMIS
                       COMB CUTTING MACHINE
               Original Filed March 1, 1920    18 Sheets-Sheet 16
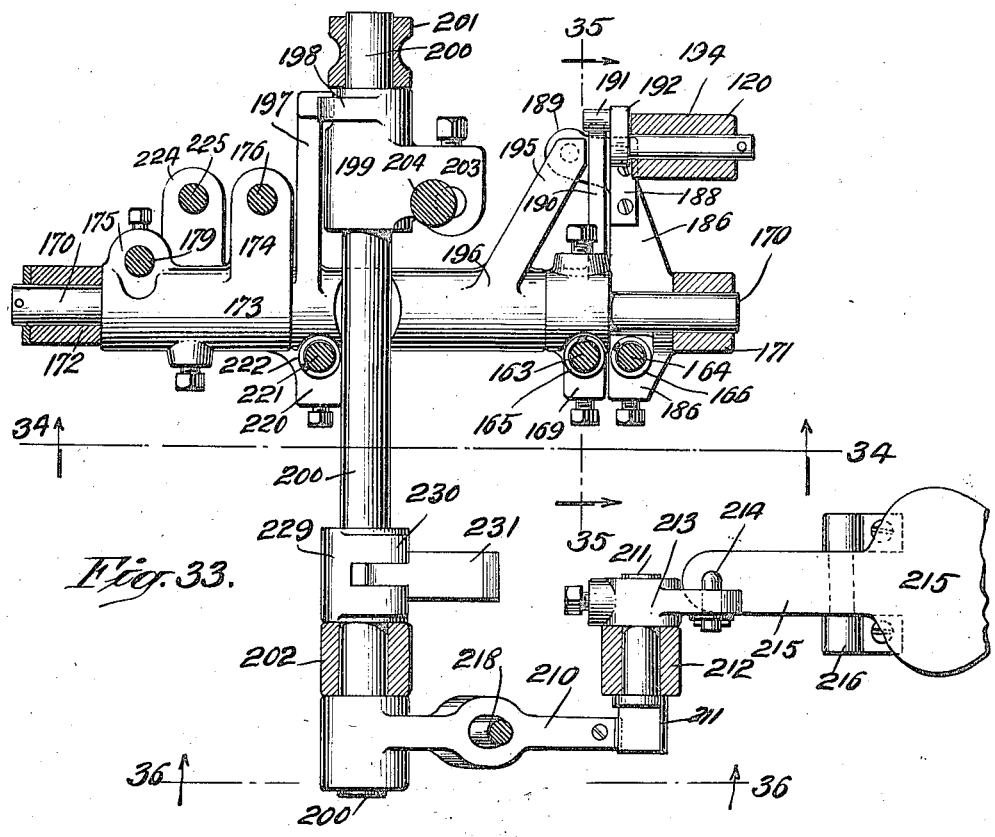
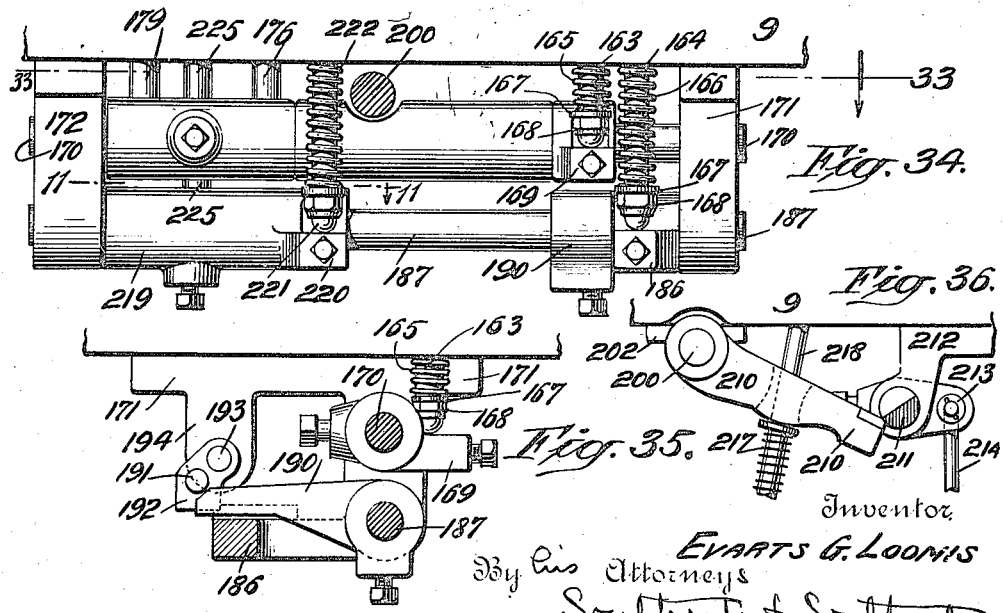
Inventor
EVARTS G. LOOMIS
By his Attorneys
Southgate & Southgate Nov. 6, 1923.

E. G. LOOMIS 1,473,111

COMB CUTTING MACHINE

Original Filed March 1, 1920    18 Sheets-Sheet 17

Inventor
EVARTS G. LOOMIS
By his Attorneys
Southgate & Southgate

Nov. 6, 1923.
E. G. LOOMIS
COMB CUTTING MACHINE
Original Filed March 1, 1920   18 Sheets-Sheet 18
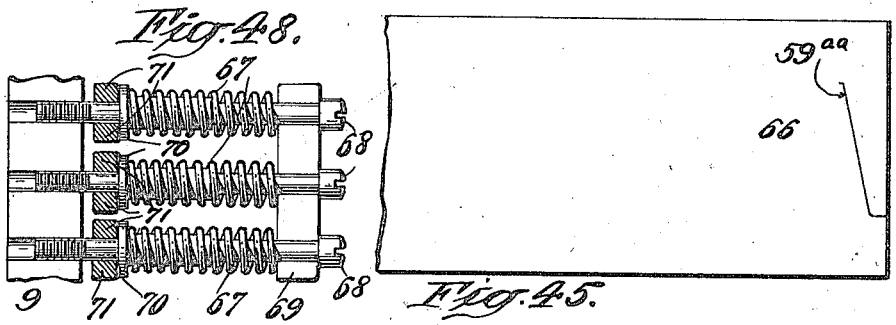
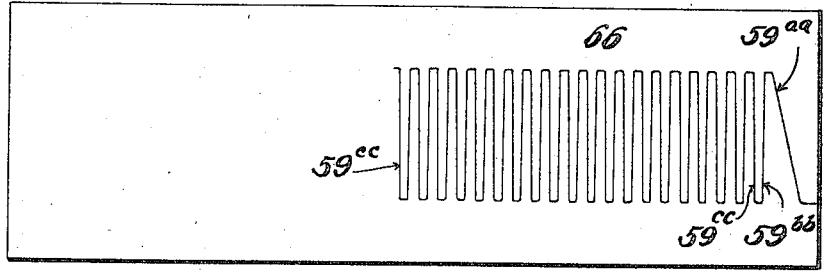
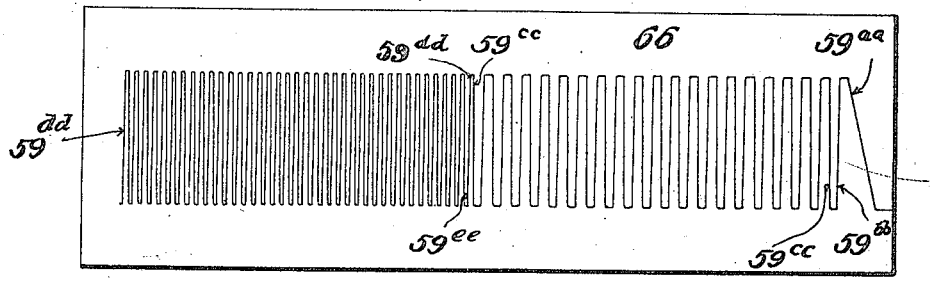
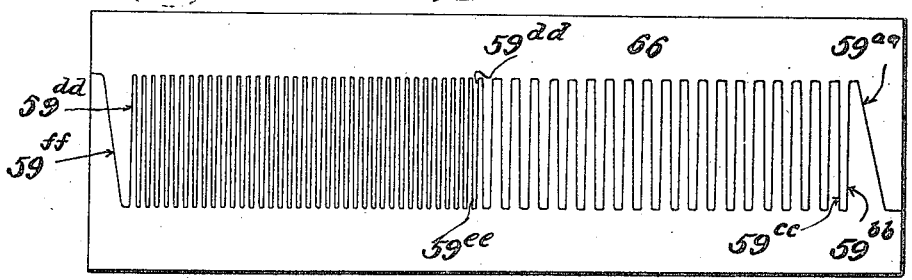
Inventor
EVARTS G. LOOMIS
By his Attorneys
Southgate & Southgate Patented Nov. 6, 1923.

1,473,111

UNITED STATES PATENT OFFICE.

EVARTS G. LOOMIS, OF NEWARK, NEW JERSEY, ASSIGNOR TO VISCOLOID COMPANY, OF LEOMINSTER, MASSACHUSETTS, A CORPORATION OF MASSACHUSETTS.

COMB-CUTTING MACHINE.

Application filed March 1, 1920, Serial No. 362,420. Renewed May 23, 1923.

*To all whom it may concern:*

Be it known that I, EVARTS G. LOOMIS, a citizen of the United States, residing at Newark, in the county of Essex and State of New Jersey, have invented a new and useful Improvement in Comb-Cutting Machines, of which the following is a specification.

The object of my invention is to provide a safe and sure and economical comb cutting machine, which will operate upon suitable blanks so as to cut any desired form of comb automatically and without skillful manipulation on the part of the operator. Heretofore, when combs have been cut, it has been customary to shift the blank or the cutter so as to provide for different forms of teeth. In the embodiment of my invention hereinafter set forth, a machine is disclosed which requires, under normal conditions, no attention from the operator, except to place a suitable blank against the stops of the blank holding clamp, and then to start the machine. After the machine has completed its cycle of operations on the blank, the operator removes the blank and replaces it with another and again starts the machine, and while the machine is operating, he separates the combs of the first blank. This cycle of operations is repeated indefinitely.

As the blank in all machines has to be operated upon while in a heated condition, and before it cools, prompt action becomes essential, and so my automatic machine clearly reduces the labor cost of producing combs because it reduces the skill required to make combs and also reduces the number of defective combs which were common in the prior art.

This and other objects are accomplished by my invention, one embodiment of which is hereinafter more particularly set forth.

For a more detailed description of my invention, reference is to be had to the accompanying drawings, forming a part hereof, in which, Figure 1 is a front elevation of a machine embodying my invention;

Figure 12 is a sectional view on the line 12—12 of Figure 6, looking in the direction of the arrows;

Figures 13 and 14 are sectional view and a plan view, respectively, of the pawling slide;

Figure 15 is a sectional view taken on the line 15—15 of Figure 6, looking in the direction of the arrows;

Figure 16 is a sectional view on the line 16—16 of Figure 15, looking in the direction of the arrows;

Figure 17 is a sectional view taken on the line 17—17 of Figure 16, looking in the direction of the arrows;

Figure 18 is a sectional view taken on the line 18—18 of Figure 6, looking in the direction of the arrows;

Figure 19 is a plan view of levers for elevating the cutters;

Figure 20 is a diagrammatic view showing the various cuts made in the blank by the six knives or chisels or cutters of the machine;

Figure 21 is a sectional view taken on the line 21—21 of Figure 4, looking in the direction of the arrows;

Figure 2:
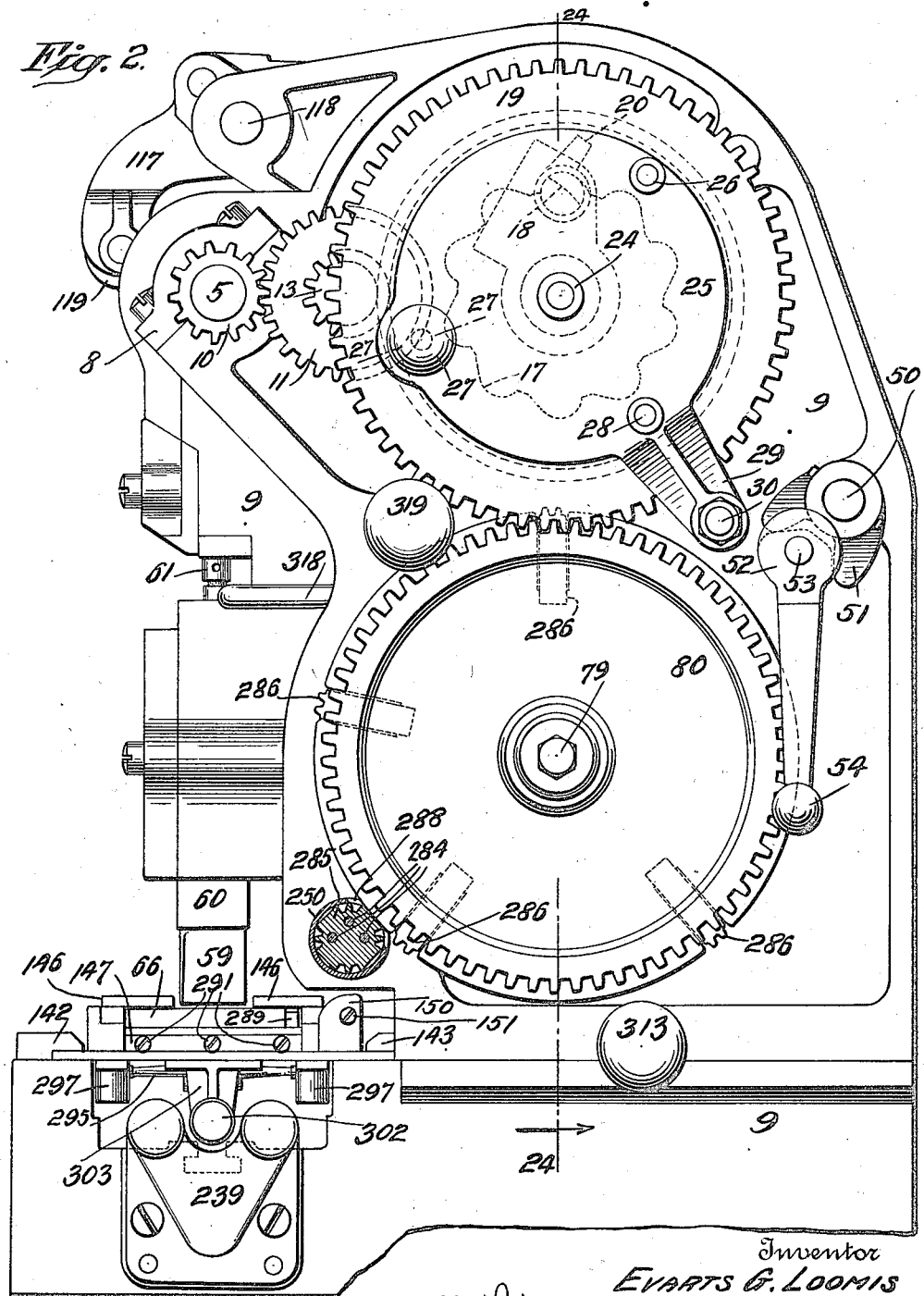
Figure 2 is an end elevation of the same, the view being taken at the right of Figure 1.

Figures 22 and 23 are sectional views taken on the lines 22 and 23 of Figure 21, looking in the direction of the arrows;

Figure 24 is a sectional view taken on the line 24—24 of Figure 2, looking in the direction of the arrows;

Figure 25 and Figure 26 are sectional views taken on the lines 25 and 26 of Figure 24, looking in the direction of the arrows;

Figure 27 is a sectional view taken on the line 27—27 of Figure 2, looking in the direction of the arrows;

Figure 28 is a sectional view taken on the line 28—28 of Figure 29, looking in the direction of the arrows;

Figure 29 is a plan view of the structure shown in Figure 28, and relates to the feeding mechanism for bringing the comb blank to various starting points.

Figure 30 is a sectional view taken on the line 30—30 of Figure 28, looking in the direction of the arrows.

Figure 31 shows a cam for shifting a control.

Figure 32 is a sectional view, taken on the line 32—32 of Figure 29, looking in the direction of the arrow.

Figure 33 shows a foot treadle and a portion of the starting mechanism, the section being taken on the line 33—33 of Figure 34, and Figure 34 is a sectional view taken on the line 34—34 of Figure 33, looking in the direction of the arrows.

Figure 35 is a sectional view, taken on the line 35—35 of Figure 33, looking in the direction of the arrows.

Figure 36 is a sectional view, taken on the line 36—36 of Figure 33, looking in the direction of the arrows.

Figure 8:
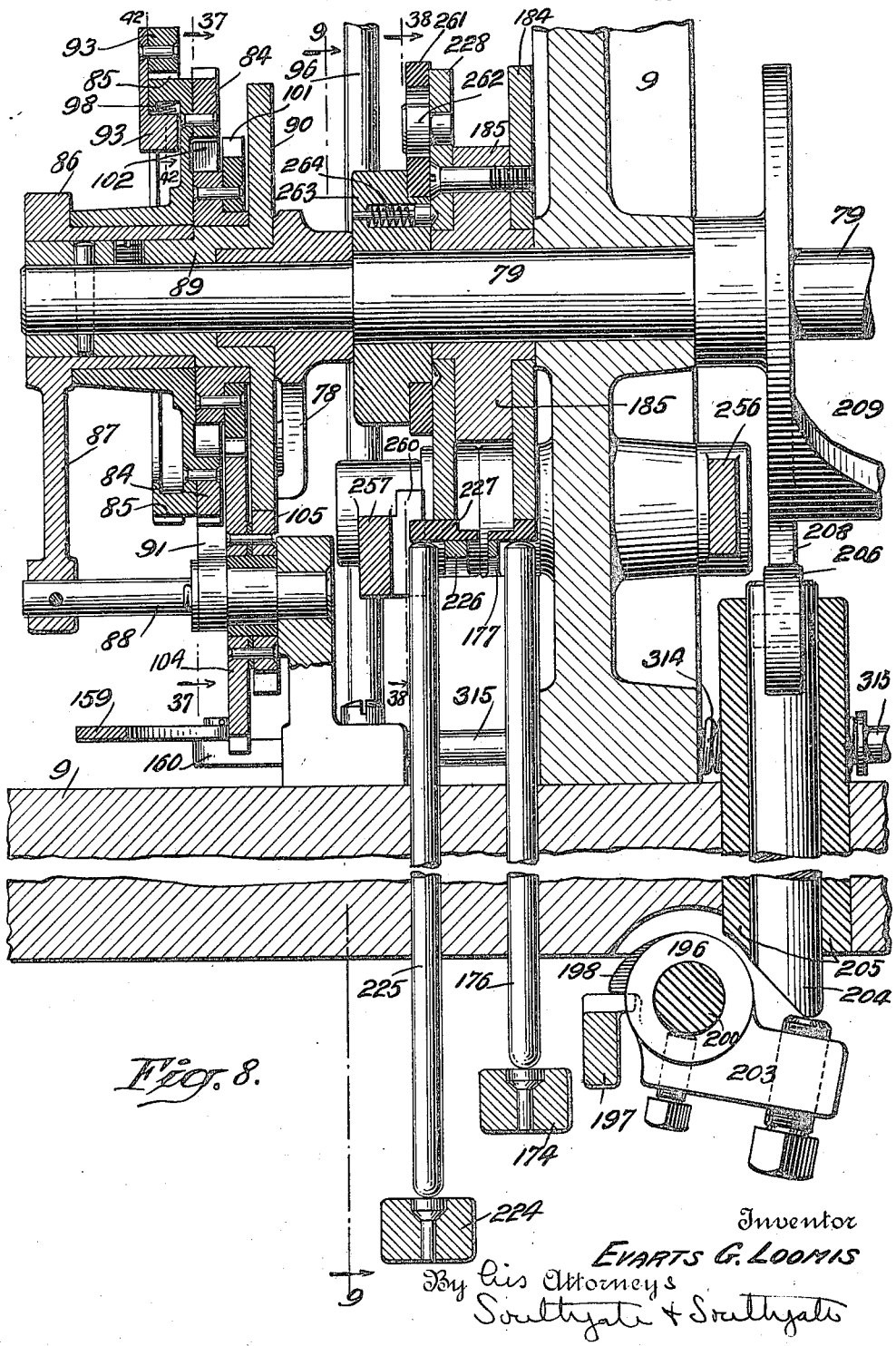
Figure 8 is a sectional view taken on the line 8—8 of Figure 3, looking in the direction of the arrows.
Figure 9:
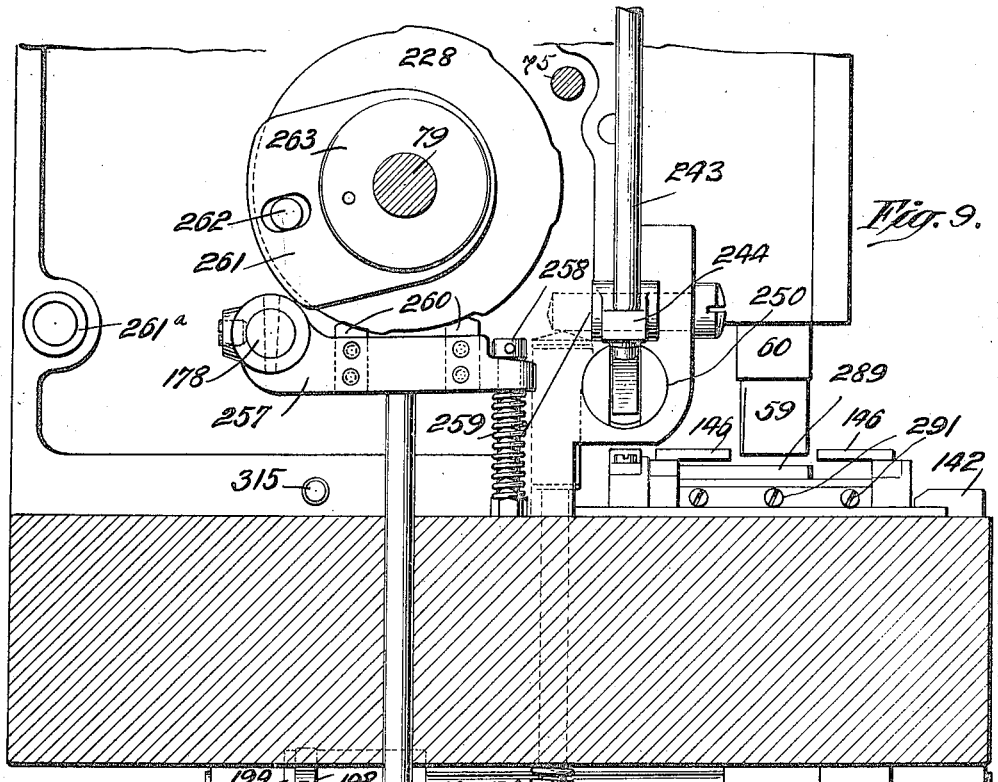
Figure 9 is a sectional view taken on the line 9—9 of Figure 8, looking in the direction of the arrows.
Figure 10:
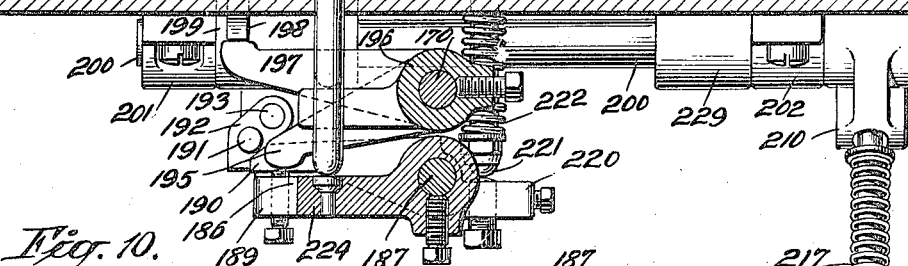
Figure 10 is a sectional view taken on the line 10—10 of Figure 1, looking in the direction of the arrows.
Figure 11:
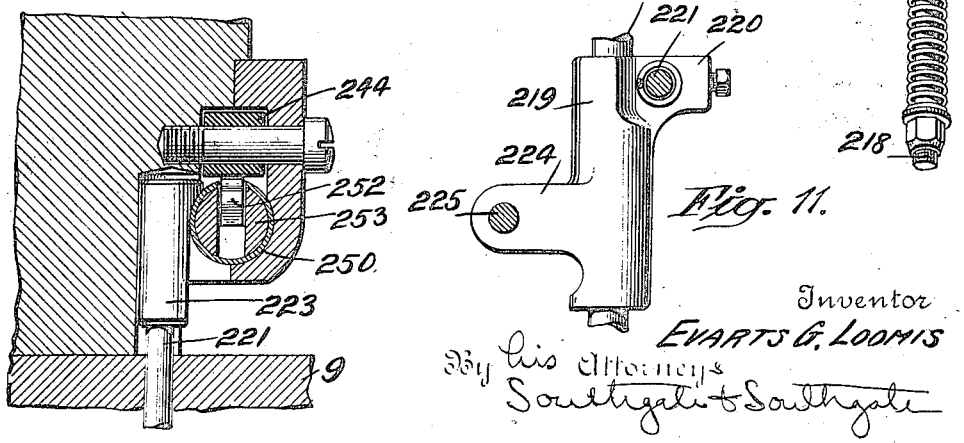
Figure 11 shows a section taken on the line 11—11 of Figure 34, looking in the direction of the arrow.
Figures 37, 38:
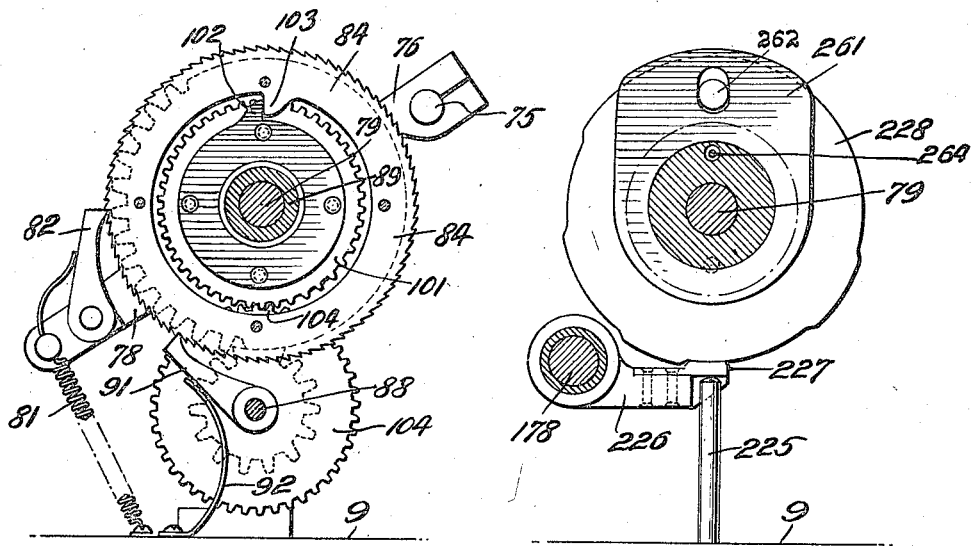

Figure 37 is a sectional view of a portion of the timing mechanism, the section being taken on the line 37—37 of Figure 8, looking in the direction of the arrows.

Figure 38 is a sectional view, taken on the line 38—38 of Figure 8, looking in the direction of the arrows.

Figure 7:
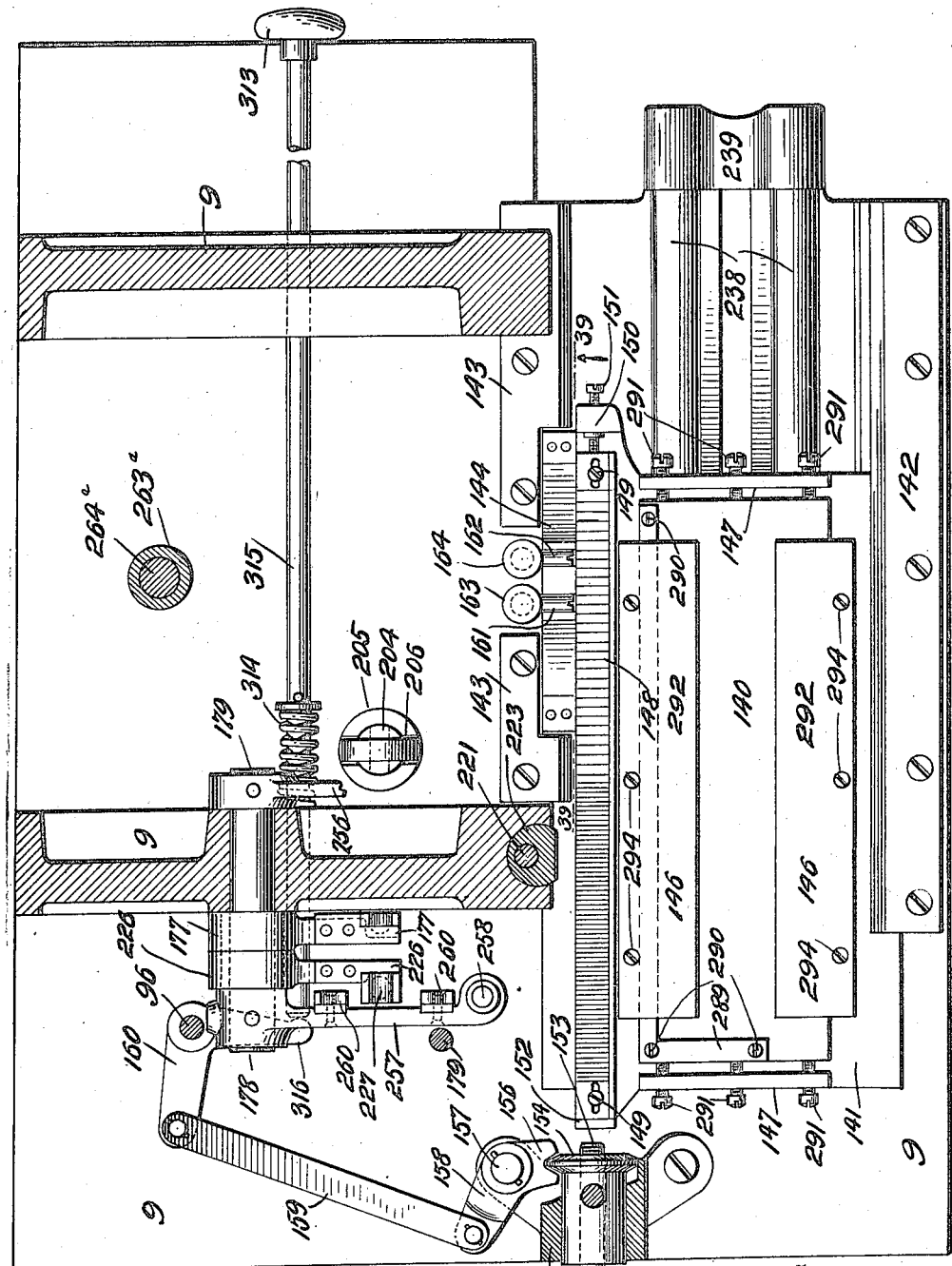
Figure 7 is a sectional view taken on the line 7—7 of Figure 1, looking in the direction of the arrows.
Figures 39, 40:
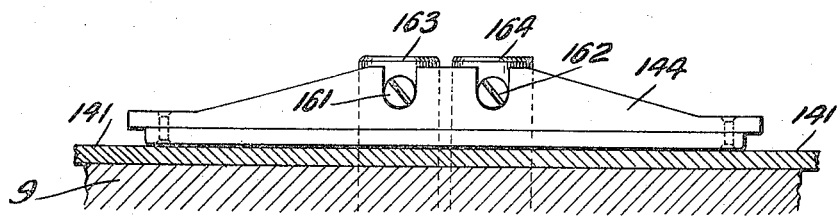

Figure 39 is a sectional view, taken on the line 39—39 of Figure 7, looking in the direction of the arrow.

Figure 40 shows a knife holder and knife, and

Figure 41:
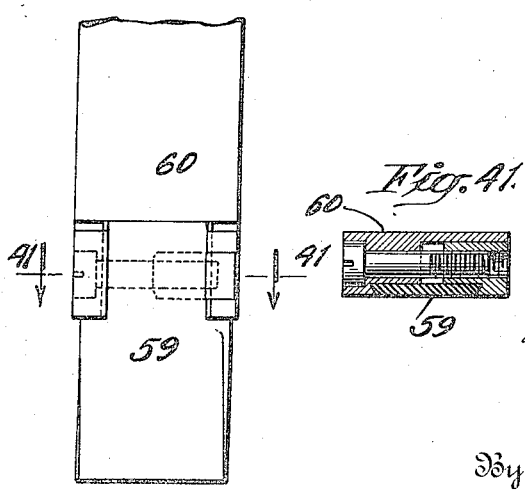

Figure 41 is a sectional view taken on the line 41—41 of Figure 40, looking in the direction of the arrows.

Figure 42:
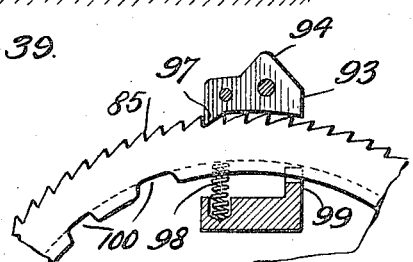

Figure 42 shows a portion of the timing mechanism, the line being taken on the line 42—42 of Figure 8, looking in the direction of the arrow.

Figure 43:
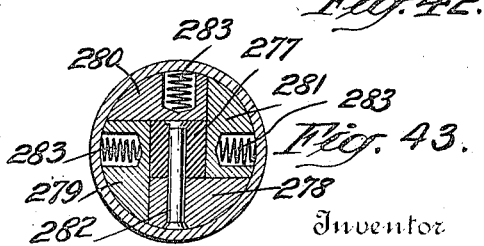

Figure 43 is a sectional view, taken on the line 43—43 of Figure 12.

Figure 44 is a plan view of a blank after the first cut has been taken to form the end teeth of two combs.

Figure 45 is a similar view of the same blank after the coarse teeth of two combs have been formed.

Figure 46 shows the blank after the coarse and fine teeth as well as the first end teeth have been cut.

Figure 47 shows the blank when all teeth have been cut and the blank is ready for separation.

Figure 4:
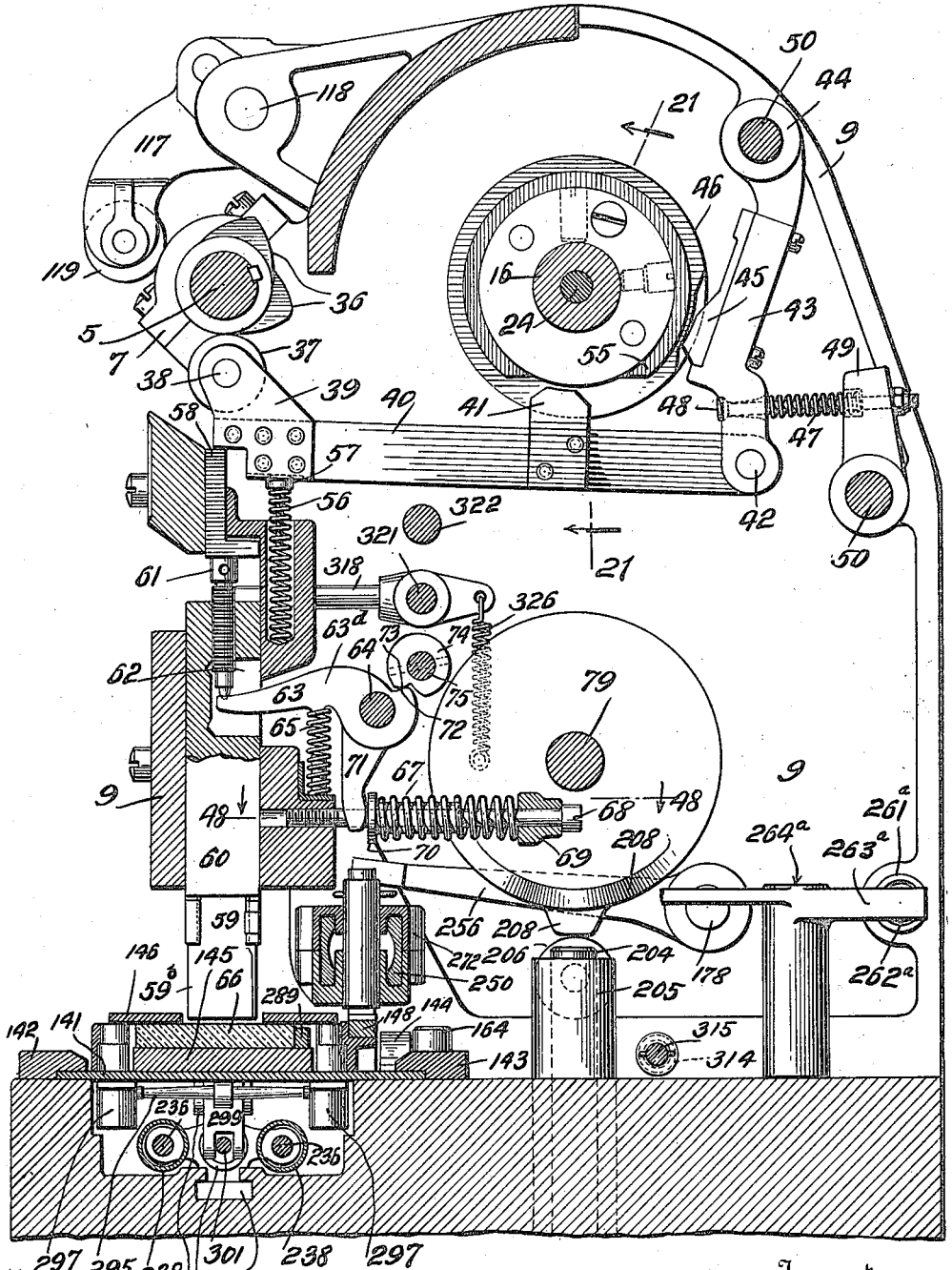
Figure 4 is a sectional view taken on the line 4—4 of Figure 1, looking in the direction of the arrows.

Figure 48 shows the springs for withdrawing the knives from the blank, the section being taken on the line 48—48 of Figure 4, looking in the direction of the arrows.

Throughout the various views of the drawings, similar reference characters designate similar parts.

In the operation of my improved machine 1 a heated blank is first clamped in the work holder and then fed to the cutting knives with an intermittent movement which is sometimes a reverse movement so that each knife will operate in the direction of its axis and in no other way, nor will it be turned about its axis so that the knife will always cut true. From this, it is apparent that generally speaking, the parts of this machine may be considered under three heads, namely, the cutting mechanism, the shifting mechanism and the clamping mechanism. These will now be considered in the order given.

*The cutting mechanism.*

The machine 1 derives power from a belt 2 which runs on either a fixed pulley 3 or an idle pulley 4, and both these pulleys are suitably mounted on the main shaft 5 of the machine. This main shaft has a number of bearings 6, 7 and 8 in the frame 9 and at its other end it is provided with a pinion 10 which drives a larger pinion 11 on a stud shaft 12 which also carries a small pinion 13 which is fixed to the pinion 11 and drives a spur gear 14 which is loosely mounted on a bushing 15 which is on a hollow shaft 16 which is parallel to the shaft 5 and suitably journaled in the frame 9. By means described below, the gear 14 may be made to drive the shaft 16 and when it does, it is driven at one-tenth of the angular velocity of the shaft 5, the gear ratio being suitable for this purpose. For convenience, this shaft 16 is hereinafter designated the upper cam shaft and the cams which it carries cooperate in the operation of the cutters and shifting mechanism, as will appear below. The means by which the gear 14 drives the shaft 16, will now be described.

On the side of the gear 14, which is remote from the frame 9, is provided an integral side cam 17, as shown in Figure 26, with ten recesses or lobes which are equally spaced about the center and any one of these may be engaged by a shaft 18 with a flattened surface which shaft is mounted in a gear 19 which is fixed to the shaft 16 and placed immediately adjacent to the gear 14. The shaft 18 is a stud shaft with a laterally extending ear 20 and also a laterally extending screw 21, shown in dotted lines in Figure 25, which is pressed by the cap of a coil spring 22, as indicated in said figure, this spur gear 19 being properly enlarged to provide for the spring and screw. The spring normally keeps the screw at the limit of its movement, as indicated in Figure 25, but it may shift against this spring when pressed by pushing against the ear in opposition to the spring 22. At times in each cycle the shaft 18 is turned so that the flat surface is toward the cam 17 and then the gear 14 can turn without driving the gear 19. At all other times the gear 19 is driven by the gear 14 and when so driven, it turns the shaft 16. This gear 14 drives when the shaft 18 is spring controlled and does not drive when the ear 20 turns this shaft. The gear 19 is at rest about eighty or ninety percent of the usual cycle of the machine.

The extreme end of this shaft 16 is provided with a nut 23 which holds the gear 19 in place against movement in the direction of its axis.

The shaft 16 is hollow and is provided with a shaft 24 which carries a disc 25 at its outer end, and this disc has three pins 26, 27 and 28 as well as a projection 29 which engages a bolt 30 which extends laterally from the frame 9 and prevents the disc 25 from turning. The pins 26, 27 and 28 extend laterally of the disc and far enough to engage the ear 20 during the operation of the apparatus, as will appear below, when the shaft 24 is in one position. When in another position, these pins are free of the ear 20. The mechanism for shifting them will be described below.

The pin 28 is three-tenths of a circumference from the pins 26 and 27, and the pins 26 and 27 are separated by a distance of substantially four-tenths of a circumference. The pin 27 is not fixed as are the pins 26 and 28 in the disc 25, but is slidably mounted in a housing 31 which contains a coil spring 32 which normally presses the pin 27 into its operative condition, but if desired, when teeth of one character are to be cut in a cam, this pin 27 may be withdrawn into the housing 31 against the tension of the spring 32 by means of the handle 33 and the screw 34 which extends therefrom and normally rests into a recess, as shown in Figure 27. It may be withdrawn from this recess and then turn a slight distance so as to rest on the housing 27 and when in this position, the pin 27 is out of operation. To hold it out of operation, it is preferable to provide a recess 35 in the end of the housing 31, as indicated.

The mechanism for shifting the shaft 24 is connected to the feeding mechanism, and will be described in detail below. At present it is sufficient to say that this mechanism shifts this shaft in the direction of its length according to the number and kind of teeth cut in the comb, and that the shaft 5 is driven clockwise so that the gears 14 and 19 are also driven clockwise when viewed, as indicated in Figure 2.

In addition to the pinion 10, the shaft 5 carries between the bearings 7 and 8, a set of lobe cams 36, six in number and properly timed, and each of these cams 36 may engage a suitable pintle 37 mounted on an axle 38 which rests in suitable bearings 39 which are fixed to a lever 40 which is provided with a cam engaging projection 41 and a movable pivot 42 which is mounted in the swinging bracket 43 which is pivoted on a shaft 44 mounted in the frame 9 of the machine. This swinging bracket 43 has a cam engaging projection 45 and this projection 45 is pressed against a cam 46 by means of a coil spring 47 on a bolt 48 which passes through this bracket and also through a lug 49 which extends upwardly from a shaft 50 which is also mounted in the frame 9. This shaft 50, at its outer end, see Figure 2, is provided with a segmental gear 51 which meshes with a corresponding gear 52 mounted on a stud shaft 53 which runs laterally from the frame 9 and parallel to the shaft 50, and this gear 52 is shifted by means of a handle 54 which extends therefrom and is so arranged and disposed that when this handle is thrown anticlockwise, the lug 49 is thrown clockwise when viewed from the position shown in Figure 4, and then the projection 45 is withdrawn from the cam 46. As will appear below, when this occurs, the knives cannot be operated and all of them may be made inoperative simultaneously regardless of which knife would otherwise be operating under the influence of its cam 36.

The projection 41 engages a cam 55 which is adjacent to the cam 46 that engages a projection 45 on the bracket 43 to which the corresponding lever 40 is connected through the pivot 42 and which carries the projection 41, and as will appear below, the cam 36 can act to force a cutter only when both the projections 41 and 45 engage suitable parts of their respective cams.

Each roller 37, when operative, is kept against its cam 36 by means of a coil spring 56 which has a cap 57 resting against its lever 40, and when the cam 46 permits the spring 47 to thrust the lever 40 forward, this lever slides on the cap 57 and engages a shoulder 58 of its knife or cutter or chisel 59. Each chisel 59 is mounted in a holder 60 which slides in a suitable recess in the frame 9, and each holder 60 is adjustably connected to its shoulder 58 by means of a capstan screw 61, as shown in Figure 4. The lower end of this capstan screw enters a recess 62 and engages a bell crank lever 63 which is mounted on a shaft 64 which is suitably secured in the frame 9. Each bell crank lever 63 is normally supported by a light spring 65 under its horizontal arm, and the lower end of this coil spring 65 is resting on the frame 9. Each spring 65 is sufficient to hold its knife elevated but its strength is not sufficient to withdraw the knife from the comb blank 66 after a cut has been made. For this purpose a stronger spring must be provided and this spring is found at 67 mounted on a screw 68 fixed in the frame 9 immediately under the spring 65. This spring 67 has at its outer end a large cap 69 and at its inner end a flanged sliding sleeve 70 which is adapted to engage the depending arms 71 of two adjacent levers 63 so that when a knife is driven into the comb blank which is connected to either of these adjacent levers, the spring 67 will act so as to promptly withdraw the chisel or knife.

Each chisel or knife 59 is placed and shaped according to the cut it is to make. The first chisel which operates (see Figure 1) is designated $59^a$, and the cut it makes is shown at $59^{aa}$ in Figures 20 and 44. The second chisel cuts one side of a coarse tooth and is designated by the character $59^{bb}$. The cut which it makes is shown in Figures 20 and 45 at $59^b$. The next chisel which operates is designated $59^c$ and its cut is shown at $59^{cc}$ in Figures 20 and 45. The chisels $59^b$ and $59^c$ act successively and cut coarse teeth. The next chisel is $59^d$ and its cut is similarly shown at $59^{dd}$ in Figures 20 and 46, and its companion chisel is $59^e$ which makes the cut $59^{ee}$, as indicated. The last chisel is designated $59^f$ which makes the cut $59^{ff}$, as shown in Figures 20 and 47. It will be noted that the chisels $59^a$ and $59^f$ are set diagonally as compared with the others, so that they will properly form the large end teeth of the combs while the cutter has only a reciprocating motion in the direction of its length and the blank has a reciprocating motion at right angles thereto in the direction of its length and so all oscillatory movements of the blank are eliminated. It will also be noted that the cutters $59^b$ and $59^c$ make one pair and $59^d$ and $59^e$ make another pair and that both pairs are necessarily separated from each other and from the end cutters. For this reason, it is obvious, as will appear below, that when the blank is fed it cannot always be fed uniformly and in the same direction, but at times it must have a backward motion so as to compensate for the spacing of the cutters. It is also apparent that where a comb is made with coarse and fine teeth, the first two cuts will be by the cutters $59^a$ and $59^b$, and the last two cuts by the cutters $59^d$ and $59^f$. If the comb is made with nothing but coarse teeth, the first two cuts will be made the same as before and the last two by the cutters $59^b$ and $59^f$.

Counting mechanism.

By the counting mechanism I mean a step by step mechanism capable of being set for a predetermined number of steps.

Figure 1:
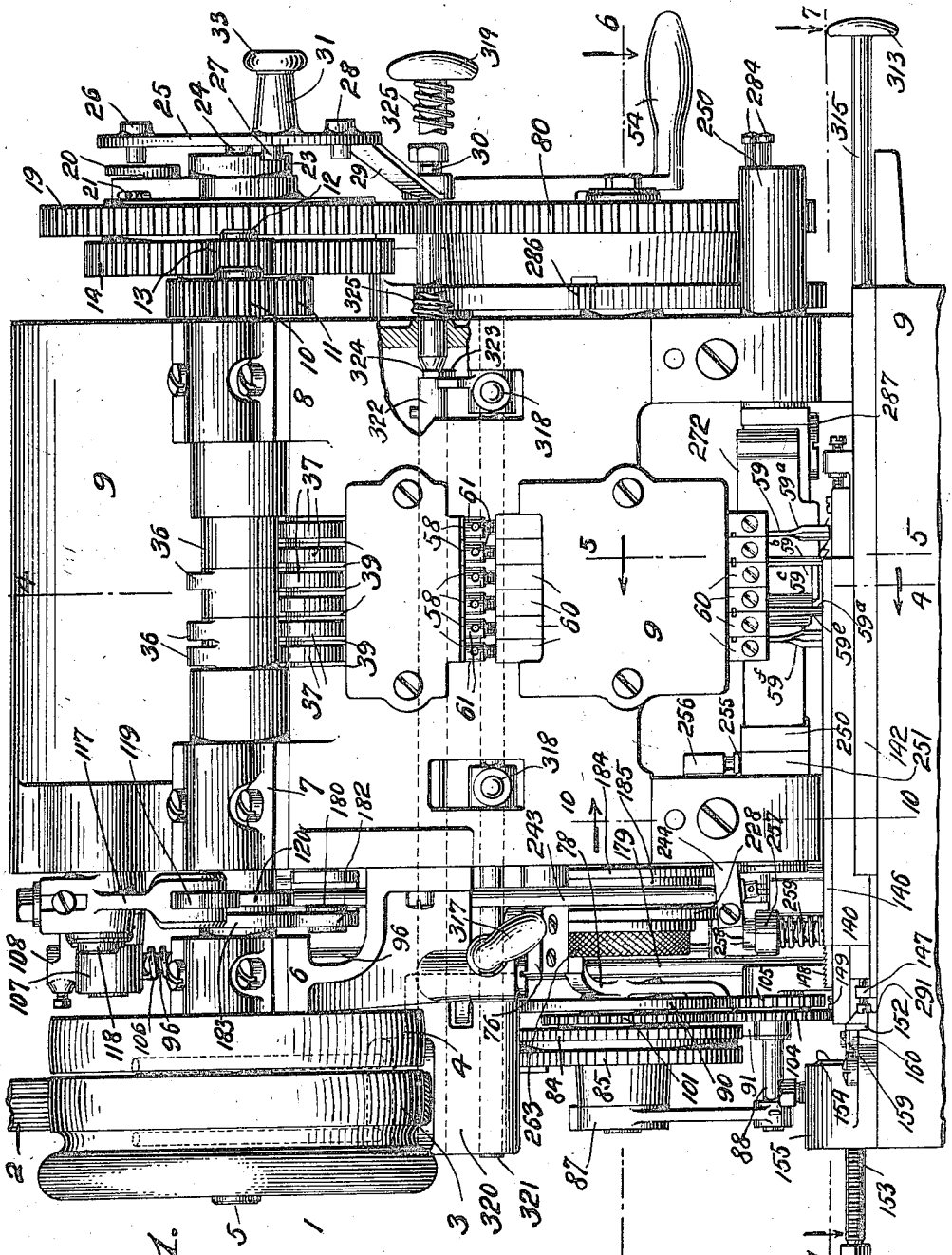

The mechanism for actuating the cutters in their proper order will now be described. For convenience the bell crank levers 63 are designated so as to correspond with their respective cutters $63^a$, $63^b$, $63^c$, $63^d$, $63^e$ and $63^f$. As shown in Figure 4 and in Figure 19, the levers $63^b$ and $63^d$ are provided with spur teeth 72 which mesh with corresponding teeth 73 on a segmental gear 74 which is fixed to a shaft 75 in any suitable manner. This shaft 75 is journaled in the frame 9 and extends through the same to the left of a machine when this is viewed from the front, as shown in Figure 1, where it is supplied with a fixed tooth 76 (see Figure 3) which engages a corresponding tooth 77 mounted on a lever 78 which turns freely on the lower cam shaft 79. This lower cam shaft 79 is parallel to the main shaft 5 and upper cam shaft 16, and at its extreme and remote end from the lever 78, it is provided with a spur gear 80 which is identical with the spur gear 19 and meshes with the same. This gear 80 is fixed to the same shaft 79 in any suitable manner so that it revolves with the same angular velocity as the cam shaft 16.

The cams and other mechanisms on this shaft will be described below. At this time it is sufficient to say that the lever 78 turns freely on this cam shaft 79 and at its other end it has a coil spring 81 which is connected to the frame 9 of the machine in any suitable manner and near this end it carries a pivoted pawl 82 which is pressed by a spring 83 against a ratchet 84 which is fixed to a second ratchet 85 of the same diameter, which ratchet is mounted on a bushing 86 which has a laterally extending arm 87 which is secured to a stud shaft 88 which projects from the frame 9 so that under no circumstances can the bushing 86 turn about its axis. The bushing 86 is mounted on a sleeve 89 which extends from an interrupted gear 90 which is fixed to the cam shaft 79. The ratchet wheel 84 is also engaged by a second pawl 91 which is mounted on the stud shaft 88 and held in place by a washer, or in any other suitable manner and pressed by a leaf spring 92 which is also secured to the frame 9 of the machine.

The ratchet wheel 85 has teeth opposed in direction to the ratchet wheel 84 which always turns in a clockwise direction when viewed from the direction shown in Figure 37 and this ratchet 85 carries a demountable spring pressed dog 93 (see Figures 8 and 42) and this dog 93 has a projecting tooth 94 which is adapted to engage a corresponding tooth 95 which is secured to a vertical shaft 96 which is connected and operates as will be described below. The dog 94 also has a tooth 97 which meshes with the teeth of the ratchet 85 and is also provided with a recess containing a spring 98 which presses the tooth 97 in place, as shown in Figure 42. This dog 93 has an outwardly extending projection 99 which takes under the rim of the ratchet wheel 85 and this ratchet wheel is provided with two adjacent recesses 100 which are properly spaced so as to permit the removal of the dog 93 from the ratchet wheel 85 by passing the spring 98 and projection 99 through these recesses, as is obvious. These recesses also permit the insertion of this dog to the position indicated or any other position to which the operator may wish to place it, as he can do by pressing the spring 98 and then sliding the dog 93 to the location where it belongs.

The ratchet 84 is also adjacent to a small spur gear 101 which is mounted to turn on the hub 89 of the gear 90 and it is adjacent to this gear and it has a boss directly under the ratchet wheel 84 and it is provided with a projection 102 which is adapted to engage a corresponding and inwardly extending projection 103 on the inner rim of the ratchet 84. This spur gear 101 meshes with a corresponding gear 104 which is mounted on the stud shaft 88 and fixed to a smaller gear 105 which meshes with the interrupted gear 90 and has one tooth recessed to receive the plain part of the gear 90. In the preferred embodiment of my invention the gear 90 has thirteen teeth and so has the gear 105, assuming that the large crown tooth is a tooth. Obviously the gears 105 and 90 are locked whenever the large crown tooth of the gear 105 is engaged by the corresponding plain surface of the gear 90.

From the foregoing, it will be understood that the shaft 75 is oscillated whenever a comb tooth is completed by the operation of the chisel or cutter 59° or 59° and at such a time the counting mechanism is shifted by the pawl 82 engaging the ratchet wheel 84 and this movement is continued until the tooth 93 engages the corresponding tooth 95 on the shaft 96 and causes the same to oscillate this shaft against the tension of a coil spring 106 which has its upper end mounted in a bearing 107 which extends from the frame 9 and its lower end in a collar fixed to this shaft. The upper end of the shaft 96 extends above the end of the bearing 107 and is provided with a crank 108 which extends laterally of the shaft and parallel to the bearing 107 and at its free end it is provided with a downwardly extending pin 109 which has its lower end resting in a slot in a slide 110 which rests on the lever 111 which is fulcrumed on the bearing bar 107. This lever 111 is supported about its middle on a spring 112 which surrounds a suitable screw 113 and rests on a bracket 114 which extends laterally from the frame 9. The screw 113 guides the spring 112 in the performance of its functions. The slide 110 is kept in proper position by means of slots and suitable cap screws 115 placed on the upper surface of the lever 111. When the shaft 96 is oscillated by the impact of the teeth 94 and 95, as above described, the operation is to shift the slide 110 forward so that it will engage the spring pressed pawl 116 which is placed at the end of the cam lever 117 which is pivoted at 118 and provided with a cam roller 119 which engages a cam 120 which is fixed to the main shaft 5.

The lever 111 is provided at its end surface with a ball and socket joint (see Figure 28) which is adjustably mounted in a screw 121 and contains the ball of a pawl 122 which extends diagonally downward and engages one of the teeth of a ratchet 123 mounted on the shaft 16. The ratchet 123 has an integral sleeve which is closed except for a perforation at its free end to receive the small shaft 24. The shaft 16 has two radially disposed perforations which are diametrically opposite and in which rest the ends of two screws 124 which are placed in a collar 125 and held in proper positions by their respective set screws 126. These screws 124 carry suitable pintles or rollers 127 which enter corresponding cam slots 128 in the cylindrical extension of the ratchet 123, as shown in Figure 30. The ratchet 123 at its extreme end, which is next to the frame 9 of the machine, is provided with a second set of ratchet teeth designated generically by the character 129, and these three teeth are adapted to engage a stud or projection 130 which is fixed to the frame 9 (see Figure 28).

From the above description, it is apparent that when the pawl 122 turns the ratchet through something like thirty degrees, it thereby causes the pintles 127 to give a thrust to the ratchet 123 so that it is brought with the teeth 129 against the frame 9 and one of these teeth soon engages the stud 130. As soon as this occurs, the ratchet 123 comes to rest and meanwhile, just before it comes to rest, the shaft 24 receives a thrust in the direction of its length which is carried through to the disc 25 and which brings one of the pins 26, 27 or 28 free of the arm 20, as indicated in Figure 24. As soon as the shaft 16 turns a little, the pintles 127 engage the grooves 128 and cause the teeth 129 to be taken off the projection 130 because the ratchet 123 receives a thrust away from the frame 9 and in the opposite direction from before so that when and thereafter, until the above mentioned cycle is repeated, the ratchet 123 turns with the shaft 16. When this reverse thrust occurs, the pins 26, 27 or 28 are again brought into the path of the projection 20, as is obvious.

From the foregoing, it is obvious that the cam shafts 16 and 79 each have one complete revolution for a complete cycle of the machine's operations. Generally speaking the cutters 59 operate successively beginning with 59$^a$ except that the pairs 59$^b$ and 59$^c$ on the one hand and 59$^d$ and 59$^e$ on the other operate alternately, the former pair cutting the coarse teeth and the latter pair the fine teeth. It is apparent from what has been said that the time of operation of each of the cutters 59 will depend upon the positions of its connected projections 41 and 45 with regard to the cams 55 and 46. Normally these cams are so timed and arranged that the cutter 59$^a$ which cuts the guard teeth of two combs simultaneously, will operate once in the cycle of comb making, and then cease to operate. The blank 66, after this has occurred, is shown in Figure 44. After the cutter 59$^a$ has ceased to operate, the cutters 59$^b$ and 59$^c$ operate alternately, first one and then the other. Between the operation of the cutter 59$^c$ and the cutter 59$^b$ the blank shifting mechanism, as will appear below, shifts the blank. There is no further shifting until after the next operation of the cutter 59$^c$. Then there is another shift corresponding to the shift just above mentioned, and the cutters 59$^b$ and 59$^c$ then cut a third tooth, first one cutter operating and then the other and so on until all the coarse teeth are cut. The cams 55 and 46 are so shaped and timed that the projections 41 and 45 are not disturbed during the cutting operation. When the operation of cutting the large teeth is finished, the corresponding cams for the cutters 59$^d$ and 59$^e$ are brought into action and at the same time cutters 59$^b$ and 59$^c$ are taken out of action and then the feed of the blank is changed to correspond and the fine teeth of the comb are cut. The condition of the blank after cutting the coarse teeth is shown in Figure 45 and after cutting the fine teeth, is as shown in Figure 46. The shifting mechanism is so timed that when the last large and guard tooth is cut by the cutter 59$^f$, it acts immediately after the cutter 59$^d$. The cam mechanism of the cam for cutter 59$^e$ is so shaped that this cutter is eliminated from the blank cutting operation so as to produce this result. However, when the instrument is set for cutting all coarse teeth a change is necessary because then when the last guard tooth is cut by cutter 59$^f$ it must act after cutter 59$^b$. This is done by having a movable plate in the corresponding cam for cutter 59$^c$ so as to eliminate this cutter for the purpose specified. This special cam feature will now be described.

It has been stated above that the cams 55 and 46 were mounted on the shaft 16. It is also true that these cams are mounted between two discs 131 and 132 (see Figures 21, 22 and 23), and these discs are fixedly mounted on the shaft 16 and so spaced that the cams 55 and 46 may be properly placed between them. As above set forth, these cams engage their respective projections 41 on their appropriate levers 40. For convenience these cams will be designated so as to correspond with the knives or cutters which they control, and in the following manner; the one at the left of Figure 21 being designated 55$^a$ and the next one 46$^a$ and thereafter 55$^b$, 46$^b$, 55$^c$, 46$^c$, 55$^d$, 46$^d$, 55$^e$, 46$^e$, 55$^f$, 46$^f$.

It is apparent from Figure 21 that these cams are perforated to receive a crank shaft 133 which has a handle 134 which may be turned in corresponding recesses in the disc 132 and this crank shaft 133 is also provided with an eccentric pin 135 which takes under a movable tooth 136 which slides in a corresponding part of the cam 46$^c$. This movable tooth 136 is kept against the pin 135 by means of a spring 137 set in a plug 138, as shown in Figure 21 and held by a set screw 139. From the foregoing it is apparent that when the shaft 133 is in the position shown, the tooth 136 is inoperative and when the handle 134 is turned to the other limit of its throw, this movable tooth is expelled enough to assume the position shown in dotted lines in Figure 22 and when in this position the recess of this cam 46$^c$ is abbreviated so that the cutter 59$^c$ loses a stroke. The reason for this is that when a comb is cut with all coarse teeth the last cut must be made by the cutter 59$^f$ and the next to the last by cutter 59$^b$. For this reason some means must be found for eliminating the last cut of cutter 59$^c$ and this is done by filling the gap in the comb 46$^c$, as above indicated.

From the foregoing, it is apparent that the cutters 59 act successively in the order given and the apparatus may be set, in so far as the cutters are concerned, for cutting either a comb with coarse and fine teeth or a comb which will have nothing but coarse teeth. By corresponding changes, if desired, this machine could be made to cut nothing but fine teeth. It is also apparent that the knives cannot operate in a manner which is designated so as to make a comb unless the comb is properly fed for the purpose. The means for feeding the blank will now be described.

*The shifting mechanism.*

The shifting mechanism 140 is supported by a base plate 141 which slides between two guides 142 and 143 and may be held in any desired position by a clamp 144 which operates in a manner which will be described below. The blank 66 is carried on the shifting mechanism and held by clamps which will be described below. It is sufficient to say at this point that this blank 66 is clamped on a bed 145 of copper or similar material which will firmly support the blank and at the same time not injure the cutter should it protrude slightly beyond the blank or permit the cutter to injure the apparatus. Clamps 146, which will be described below, hold the blank 66 in place on the copper support 145.

The plate 141 which slides between the guides 142 and 143, as above described, has upwardly projecting flanges 147 at each end which are provided with set screws that hold the copper block 145 between them and the inner side of this plate, adjacent to the guide 143, is provided with a raised seat which carries the rack 148 which is provided with slots at each end to receive screws 149. The seat on which the rack rests has an upwardly turned projection at one end. One of these projections 150 has an adjusting screw 151 which shoves this rack near a projection 152 at the other end of the seat so that the rack 148 may be held true at all times and it is also apparent that it may be readily removed and a new rack substituted whenever desired. The rack will vary as to the size of teeth and kinds of teeth according to the comb to be cut. At the rear end of its movement, the projection 152 engages a screw 153 which is provided with a collar 154 and the screw is mounted in an upright 155 which rises from the frame 9 and is fixed thereto and the collar 154 meshes with the teeth of a segmental gear 156 which is pivoted on a stud 157 that rises from the frame 9 and this gear has a projecting arm 158 which is pivotally connected to a link 159 which is in turn pivotally connected to an arm 160 which is fixed to the shaft 96 so that when the end of the run of the rack 148 is reached, the shaft 96 is shifted just the same as when the projection 95 is shifted, as above described, and the corresponding parts are shifted, as above set forth.

The clamping mechanism for holding the slide 140 at any desired position, will now be described.

It will be noted, as shown in Figure 7, that the guide 143 is recessed so as to receive the clamp 144. This clamp has its central upper portion hollowed out to receive two screws 161 and 162, respectively, which rest in the uprights 163 and 164. These uprights come through the horizontal portion of the frame 9 and below this frame 9 (see Figure 34) they are provided with coil springs 165 and 166, respectively, which rest on their respective washers 167, and these washers rest on nuts 168 at the lower ends of these rods. Obviously, these coil springs 165 and 166 will cause the clamp 144 to firmly hold the slide 140 unless both of the uprights 163 and 164 are shifted simultaneously against the tension of their respective springs. This elevation at the appropriate times is secured by a mechanism which will now be described.

The lower end of the upright 163 rests on a lever 169 which is fixed to a suitable shaft 170 journaled in suitable brackets 171 and 172 which are secured to the under side of the frame 9. A collar 173 is fixed to this shaft 170 by a set screw or in any suitable way, and this collar has two laterally extending arms 174 and 175. The arm 174 engages an upright rod 176 which runs upwardly through the table 9 (see Figure 8) where it engages at its upper end, an oscillating lever 177 which runs close to an upright of the frame 9 and is loosely mounted on a stud shaft 178 pivotally mounted in this upright.

The projection 175 engages a vertical shaft 179 which runs through the table of the frame 9 to an arm 180 which is pivoted on a stud 181 which extends from the frame 9 and at its other end this arm 180 has a cam roller 182 which engages a cam 183 on the main shaft 5. From this it is apparent that the clamp 144 is released by the cam 183 on the main shaft once each revolution and it is also released under the influence of the rod 176 in a manner which will now be described.

The rod 176 engages a rocker arm 177 which is pressed against a cam 184 which is fixed to a hub 185 by a screw or other suitable means and this hub is fixed to the lower cam shaft 79. The cam 184 is so timed that it causes the clamp 144 to bind only at the end of the operation of comb cutting and the cam 183 is timed to cause clamping while the cutters operate.

The mechanism connected with the rod 164 will now be described. The lower end of this rod rests on a lever 186 which turns free on a shaft 187 which is mounted between the brackets 171 and 172 and runs parallel to the shaft 170 and below the same. This lever 186 has a plate 188 secured thereto on its upper surface so as to form a shoulder at its outer end and adjacent to this plate 188 and extending laterally therefrom, this lever 186 has an ear 189.

The shaft 187 has a cam lever 190 fixed thereto which cam lever extends parallel to the plate 188 and has its outer end beveled to engage a pin 191 on a pawl 192 which is pivotally mounted on a shaft 193 which extends from an ear 194 which is attached to the bracket 171 and forms an integral part thereof, as shown in Figure 35. As shown in Figure 35, the lower end of the pawl 192 is offset from this pivot 193 so that this lower end will swing against the end of the plate 188 at the appropriate time, as shown in Figure 35, or will swing over the same at other times and hold the lever 186 in its lowered position until the cam lever 190 acts against the pin 191 to throw the pawl 192 so that it cannot assume the position shown in Figure 35. The lever 186 is lowered so that the pawl 192 can swing over it and hold it by means of an arm 195 which extends from a sleeve 196 that is pivotally mounted on the shaft 170 and this sleeve 196 has at its other end a laterally extending arm 197 with a projecting outer end that takes under a corresponding projection 198 on a sleeve 199 which is fixedly mounted on a shaft 200 which is mounted in brackets 201 and 202 which extend downwardly from the under surface of the table of the frame 9. The sleeve 199 also has an extension 203 which supports a vertically disposed rod 204 that passes upwardly through a suitable bushing 205 in the table of the frame 9 and at its upper end this rod 204 is provided with a cam roller 206 which engages the periphery of a cam 207 which is fixed to the shaft 79 and adjacent to the frame 9. The cam 207 has one downwardly extending projection 208 and a laterally extending projection 209, the purpose of which will appear below. The projection 208 from the smooth periphery of the cam engages the roller 206 so that once during each revolution of the shaft 79 the rod 204 is depressed and so is the projection 203 while the projection 198 is elevated, and when this occurs, the projection 195 is elevated so that the lever 186 is no longer held down by the projection 195 and it may, other circumstances permitting, be raised by the pressure of the coil spring 166 about the rod 164.

However, there is another means for depressing the projection 198, as will now appear, and when this occurs the lever 186 is correspondingly depressed. Furthermore, this mechanism for depressing the projection 198 causes a corresponding elevation of the projection 203 and thereby keeps the cam roller 206 against the cam 207 through the action of the rod 204 which connects this roller with the projection 203. At its remote end from the bearing 201 the shaft 200 has fixed thereon a lever 210 which extends diagonally and upwardly, as indicated in Figure 36 and in Figure 33, and this lever at its lower end, is adapted to engage a release pin 211 which is journaled in a bracket 212 which extends downwardly from the under surface of the table of the frame 9 of the machine and this release pin 212 is fixedly connected to a crank 213 which has a link 214 which connects it with a foot treadle 215 pivoted at its middle to supports 216 so that when the foot treadle is depressed in the usual way by the operator, the link 214 is elevated and the pin 211 is turned so as to be free of the lever 210 which can then rise under the influence of a spring 217 which is placed under this lever and on a pin 218 which is hung from the bottom of the table, as indicated in Figure 36. This spring 217 thereby causes a normal depression of the projection 198 and its connected parts, as above indicated, which depression normally permits the pawl 192 to swing over the plate 188 and thereby hold the lever 186 depressed until the cam 207 acts in the reverse direction so as to permit this lever 186 to rise and this permissive movement must be supplemented by the action of cam lever 190 which swings the pawl 192 above the end of the plate 188, and then the lever 186 rises because its shorter arm is depressed by the spring 166. During the rising from the long arm of the lever 186 and while it is raised, the clamp 144 is held through the rod 164, as above explained, and when this long arm of the lever 186 is depressed, this clamp is released. The mechanism for actuating the cam lever 190 so as to complete the operation above described in part, will now be set forth. This lever 190, as above stated, is fixed to the shaft 187 and near the bracket 172 has fixed thereon a sleeve 219 which has a laterally projecting ear 220 that takes under a rod 221 and supports the same by means of a washer and nut connection against the tension of a coil spring 222 which rests against the lower surface of the table of the frame of the machine, and the upper end of this rod 221 is guided by an upright of the frame 9 through an enlargement 223 which is recessed and shaped so as to fit the pawling slide and locks the same in a manner which will be described below. At this point, it is sufficient to say that this enlargement 223 engages the pawling slide when the tension of the spring 222 is not overcome.

The sleeve 219 also carries a laterally extending projection 224 which supports a vertical rod 225 that runs parallel to the rod 176 (see Figure 8) and this rod extends through the table of the frame 9 and is guided thereby and runs upwardly to a cam lever 226 which is pivotally mounted on the shaft 178 (see Figure 38) and the upper surface of this lever 226 has a rubbing surface 227 which engages the periphery of a cam 228 which is fixed to the boss 185 by a screw or in any other suitable manner. Obviously, this cam 228 operates so as to lock and unlock the pawling slide and also so as to cause the cam lever 190 to operate at the proper time and in the manner described with the net result that the clamp 144 is held through the rod 164 only on the completion of the cycle of the operations of the machine, as will appear more fully below.

In addition to the parts above described, the shaft 200 also carries a sleeve 229 from which extends upwardly and through a proper opening in the table, a crank arm 230 which crank arm carries a pawl 231 which is also supported by a spring pressed pin 232, as shown in Figure 15, which pin engages a rack 233 on the bottom of the comb slide 140 for a purpose that will appear below. At this point, it is sufficient to say that when the shaft 200 is turned under the influence of the spring 217, as above described or under the influence of the rack 233 in a manner which will be described below, the pawl 231 continues in a contact with the rack until free of the same and it may be freed by being rubbed against a fixed cam 234 which is above the opening through which the crank 230 extends, as indicated in Figure 15.

The rack 233 is fixed to a cross head 235 which in turn has two piston rods 236, one at each end, and these rods have piston heads 237 with suitable packings which engage the walls of cylinders 238 with air tight joints, and the cylinders 238 have piston heads 239 and connections 240 with a suitable source of compressed air so that the air pressure in the cylinders 238 is above that of the atmosphere and under this pressure the comb slide 140 may be brought to its initial position through connections which will be described below in connection with the clamping mechanism 146. At this time, it is sufficient to say that the pawling mechanism, which will be described below, moves the comb slide in one direction and the pneumatic mechanism, which has just been described, moves the slide in the other.

The pawling mechanism will now be set forth. The pawling mechanism is driven from the cam lever 117 which has been described above and for this purpose this lever has an adjustably mounted socket 241 which may be moved in the direction of the length of one arm of the lever and more or less remotely from the pivot 118 by means of a screw 242 of the conventional kind. This socket 241 is directly connected to the vertically disposed pawling rod 243 which runs from this socket to the pawling rocker 244 which is pivoted in a suitable recess 245 of the frame 9. This rocker is held against the rod 243 by means of a coil spring 246 which has one end connected to the rocker and its other end connected to the frame 9 of the machine. This rocker 244 has a downwardly depending arm 247 with two fingers 248 and 249, the former being at the bottom, and the latter midway between the bottom and the center of the pivot on which this rocker oscillates under the influence of the spring 246 and rod 243. The recess 245 runs into a larger recess which carries the pawling slide 250 which passes through a corresponding opening in the other upright of the frame 9, as shown in Figure 12, and this pawling slide 250 has fixed therein and adjacent to the rocker 244 a slotted member 251 which carries a pawl 252 which is pivoted therein so that it may engage the finger 249 or rest between the fingers 248 and 249 and then be inoperative. The finger 248 engages a shoulder 253 which is fixed in the end 251 of the pawl slide 250 and carries a coil spring 254 which is placed in a suitable recess and bears upwardly against the rocker 252 so as to normally cause the same to rest with its end in the inoperative position between the fingers 248 and 249, as above described. However, this rocker may be thrown into its operative position by means of a capstan screw 255 set in a lever 256 which is fixed to the stud shaft 178, and the other end of this stud shaft carries a corresponding lever 257, and the extreme end of this lever is perforated to receive a capstan screw 258 which is surrounded below the lever 257 with a coil spring 259, which rests on the table of the frame 9 and supports this lever, and this lever also has two upwardly extending projections 260 which are adapted to engage an interrupted cam 261 which is perforated near its periphery and provided with a guiding pin 262 which is set in the cam 228, and this cam 261 is also mounted on an eccentric 263 which is loosely mounted on the shaft 79 so that it may be turned so as to either project or withdraw the cam 261 at the option of the operator of the machine. A spring pressed detent 264 holds this eccentric so that the cam 261 may be either projected or withdrawn, as above described. When projected, this cam can engage the projections 260 of the lever 257, and when withdrawn this cam is free of said projections and does not actuate them. The purpose of this cam 261 is to cause a depression while the machine is cutting the fine teeth of a comb and so this cam is made of the shape indicated or substantially three-tenths of the circumference of a circle, and is so placed and timed, that these levers will be depressed during this operation, and then the pawl 252 has its rear end correspondingly depressed against the tension of the spring 254 so that its point is elevated to contact with the finger 249 and then the feed of the pawling mechanism 250 is just one-half of the feed when the finger 248 is active because the distance from the center of motion of the finger 249 is one-half that of the pawl 248, as above set forth.

The mechanism for reciprocating the pawling slide 250 has been set forth, and now will be set forth the mechanism which connects this slide 250 with the rack 148 so that the two members will operate together to give the requisite feed at the right times for the operation of the machine.

Figure 6:
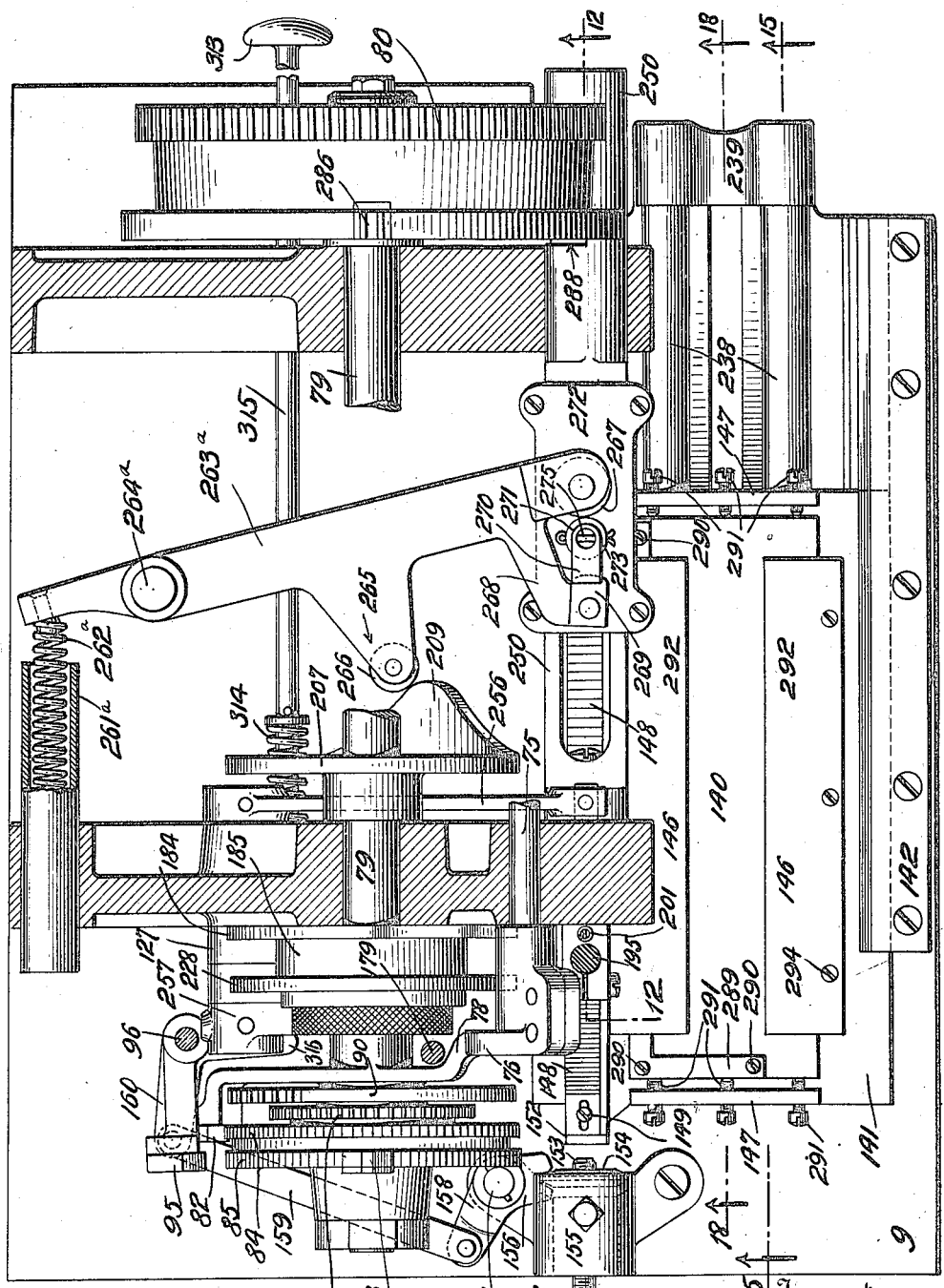
Figure 6 is a sectional view taken on the line 6—6 of Figure 1, looking in the direction of the arrows.

By referring to Figures 4 and 6, it is apparent that at the rear of an upright of the frame 9 is located a tube 261ª which is closed at one end and open at the other, as indicated, and contains a coil spring 262ª which is a compression spring that has its free end engaging the cam lever 263ª which is fulcrumed at 264ª on a suitable upright rising from the table of the machine. This cam lever 263ª has one laterally extending projection 265 which has a cam roller 266 which engages the side face of the cam 207 and its projection 209, which has been referred to above, and at its free end this cam lever 263 is bifurcated and provided with a cam roller 267 in its straight branch, and in its off-set branch 268 it is provided with a cam plate 269 which is adapted to take under a beveled shoulder 270 of the pawl 271 which is carried in a carriage 272 which is slidably mounted on the pawl slide 250 and the lower end of this pawl 271 engages the rack 148 in the conventional manner. The pawl 271 is surrounded by a suitable sleeve 273 which is fixed in the slide 272, and this sleeve has an upwardly extending portion which is engaged by the roller 267 so that the roller does not come in direct contact with the pawl. The pawl is hollow with a closed lower end and provided with a coil spring 274 which has its bottom resting on the bottom of the pawl and its top resting against a cotter pin 275 which passes through corresponding perforations in the sleeve 273 so that the pawl and rack are normally kept in proper contact, although they may be elevated from this position when the roller 266 engages the cam projection 209, which extends something like two-tenths of the circumference of the circle.

From the foregoing, it is apparent that the pawling mechanism which is actuated through the rocker 244 is directly opposed to the cam lever 263 and that this cam lever derives power from its compression spring 262 which enables it to keep the rocker 244 in contact with the appropriate part of the pawl slide 250, and its connected mechanism, as above set forth.

The carriage 272 has a limited movement on the pawl slide 250 which is large enough to cover the requisite movement of the comb slide for all combs cut by the machine and the sleeve of this slide 250 is appropriately recessed for the purpose and is made hollow where this carriage slides. This carriage also has a suitable recess which receives a disc 276 on the end of a stem 277 which is circular at the disc and about the disc and square in cross section near its other end to receive a number of adjusting blocks 278, 279, 280 and 281. The block 279 is the longest and is fixed to the rod 277 by means of a rivet 282 or other suitable means and the remaining blocks are held in position by suitable coil springs 283 which are let in suitable recesses, as shown in Figure 43. The blocks 278, 280 and 281 are of varying length and each one is provided with an adjusting screw 284 which passes through a segmental gear 285 that is fixed to the rod 277 and adapted to mesh with the interrupted teeth of the gear 286, as shown in Figure 2. These teeth 286 are set so as to mesh intermittently.

The bottom of the pawl slide 250 is provided with a stop screw 287 which determines the position of the carriage 272 according to which block is brought against it. This carriage 272 is nearest the gear 285 and when the block 279 is engaged and more remote when the other blocks are active as appears when Figure 12 is examined. These blocks 278, 279, 280 and 281 are each given an appropriate length according to the positions of the cutters 59, the first cutter 59ª acting in cooperation with the block 279 and the remaining cutters with the three remaining blocks, the block 280 acting with cutters 59ᵇ and 59ᶜ and the block 281 with cutters 59ᵈ and 59ᵉ and block 278 with cutter 59ᶠ. Obviously, the pawl 271 feeds the rack 148 as indicated except that there is an occasional reverse movement when a block shifts from a longer to a shorter and this reverse movement occurs while the rack and pawl are engaged and under the pneumatic influence above set forth, and that when the pneumatic action returns the comb slide 140 to its original position, this pawl 271 is out of engagement with the rack 148 and held so by the cam plate 269. In order that the gears 285 and 286 may mesh, the slide 250 is recessed at 288 for this purpose.

*The clamping mechanism.*

The clamping mechanism 146 holds the comb blank true on the cutter or other block 145 which supports the blank while it is cut. To guide the blank properly, it is preferable to provide the cutter block with a fixed guide 289. The guide 289 has two parts and is held by screws 290 and the parts run at right angles to each other and are so placed and arranged that they do not interfere with the action of the clamps or the clamping mechanism. The block 145 is properly adjusted by the set screws 291 which extend through the flanges 147.

Figure 5:
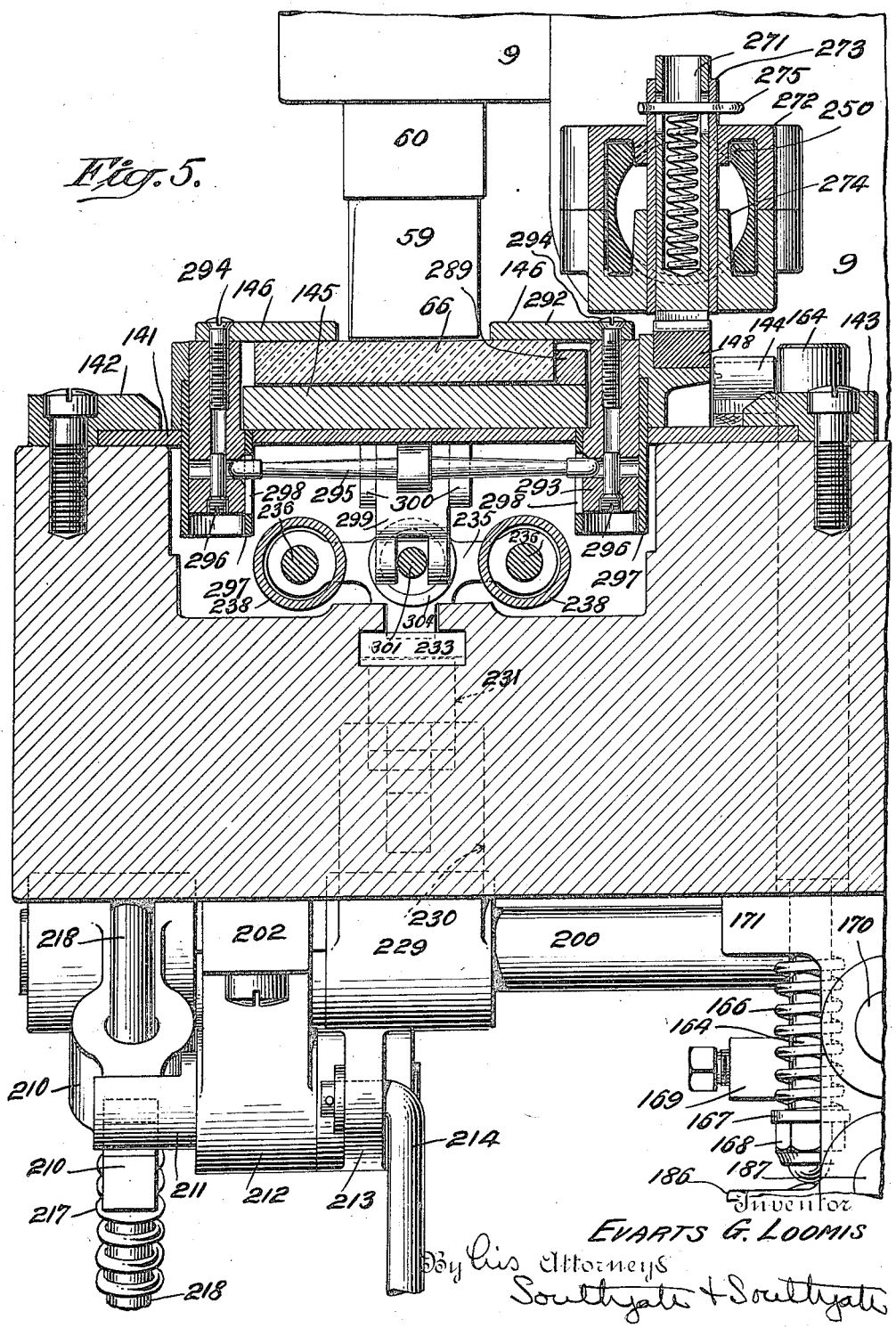
Figure 5 is an enlarged sectional view, taken on the line 5—5 of Figure 1, looking in the direction of the arrows.

At each side of the block 145 and above the same are clamping plates 292 each of which is mounted on three studs in a row at each side which are designated by the character 293 and the clamping plates 292 are held in these studs by suitable screws 294 or in any other appropriate means. These studs are carried by the sliding plate 141 and extend below the same and receive the spring parts 295 which are preferably made of spring steel and may be shoved to one side or the other and removed by removing a bottom screw 296 (see Figure 5) at the bottom of each stud. Each of the studs 293 slides in a bushing 297 which is fixed to the slide 141. Each part 295 can move in a groove or vertically disposed slot 298, one in each bushing 297, as indicated, so as to cause the plates 292 to rest on a blank 66, which may be more or less uneven, as such blanks frequently are, and yet the clamp holds firmly because of the resiliency of the cross bars 295 and also because of the spring mechanism which will now be described. Each part 295 is connected to one arm in a bell crank lever 299 which is pivoted in brackets 300 which depend from the slide 141 and the lower arm of each bell crank lever 299 straddles a rod 301 which has a fixed handle 302 at one end which slides freely in a suitable bracket 303 which depends from the slide 141, as shown in Figure 18. Next to this handle 302 is a coil spring 304 which presses against a washer 305 and this washer presses against a small collar 306 which surrounds the shaft 301 and is straddled by the lower end of a bell crank lever 299 and next to this collar 306 is placed a fixed collar 307 which is fixed on the shaft 301 in any suitable manner, and next to this is a spring 304 which is connected to a washer as before and in this way each of the bell crank levers 299 is connected to the rod. Under normal conditions the springs 304 act on these bell crank levers and cause them to have the clamping plates 292 in close contact with the blank 66 though the blank be somewhat irregular, as above specified. The extreme inner end of the shaft 301 is provided with a cylindrical head 308 which fits a corresponding bore in the cross head 235 and which has its end pressing against a coil spring 309 in said bore which spring forces this head out of the bore whenever the cross pin 310 of this head permits. This engages the bayonet groove 311 of the cross head. The tension of the spring 309 when compressed, as above set forth, always causes a tight connection between the head 308 and the cross head 235.

To insure the correct alinement of the shaft 301 at all times, it passes through the second guide 312 which depends from the slide 141 and runs parallel to the bracket 303 and serves the same purpose.

From the foregoing it is apparent that the tensions on the springs 304 tend to swing the bell crank levers so as to clamp the plates 292 against the blanks 66 and when these tensions are overcome by shoving the rod 301 in the reverse direction, the clamp is released. This reverse movement is had at the end of the throw which comes at the end of the cycle of the operations of the machine when the pawl 231 gives a thrust to the rack 233, and this thrust is occasioned by the downward movement of the roller 206 under the impact of the projection 208 of the cam 207 in the manner which has been described above. While the clamp is so released, a cut blank is removed and a heated blank inserted and thereafter the foot treadle may be depressed to start the machine on the cycle which has been described above in a general way and which will be described more in detail below.

Miscellaneous mechanisms.

The foregoing has set forth the cutting and other mechanisms of the apparatus, but these alone are insufficient because it is either the machine or parts of the machine. Above has been described in connection with the shaft 50 a mechanism for stopping the cutters of the machine. After such a stopping, it is sometimes necessary to start the machine afresh and to restore it to the original cycle, when the operator grasps a handle 313 which is shown at the right of the apparatus when viewed from the position shown in Figure 1, and it gives this handle a movement to the left against the tension of a coil spring 314 and thereby causes the end of the rod 315 to shift an arm 316 which is fixed to the lower end of the shaft 96 (see Figures 3 and 7) and thereby cause the movement incidental to the shifting of this shaft, as above described. Sometimes, it is necessary to stop the machine altogether and this may be done by throwing downwardly one of the handles 318 near the middle of the machine. The rod which carries the belt shifter described below has a handle 319 at the extreme right of Figure 1. The handle 317 is connected to a slide 320 which carries suitable arms for shifting the belt, as indicated in dotted lines, so that by shifting this handle, the belt is thrown and the handles 318 are pivotally mounted and fixed to a shaft 321 which is below the shifting shaft 322. The handle 318 at the right has a boss with a projection 323 which engages a corresponding projection 324 on the rod 322. This rod slides so as to shift the belt from the fixed to the idle pulley under the tension of a coil spring 325 which rests against the handle 319 and also against the frame 9 of the machine. A coil spring 326 acts through a projection 327 fixed on the shaft 321 to hold the handles 318 in their horizontal position, indicated in Figure 1 (see Figure 4). From the foregoing, it is apparent that when either of the handles 318 is lowered the belt 2 is instantly shifted from the active to the idle pulley.

Operation.

In view of the foregoing, the operation of my improved machine will be readily understood.

Figure 3:
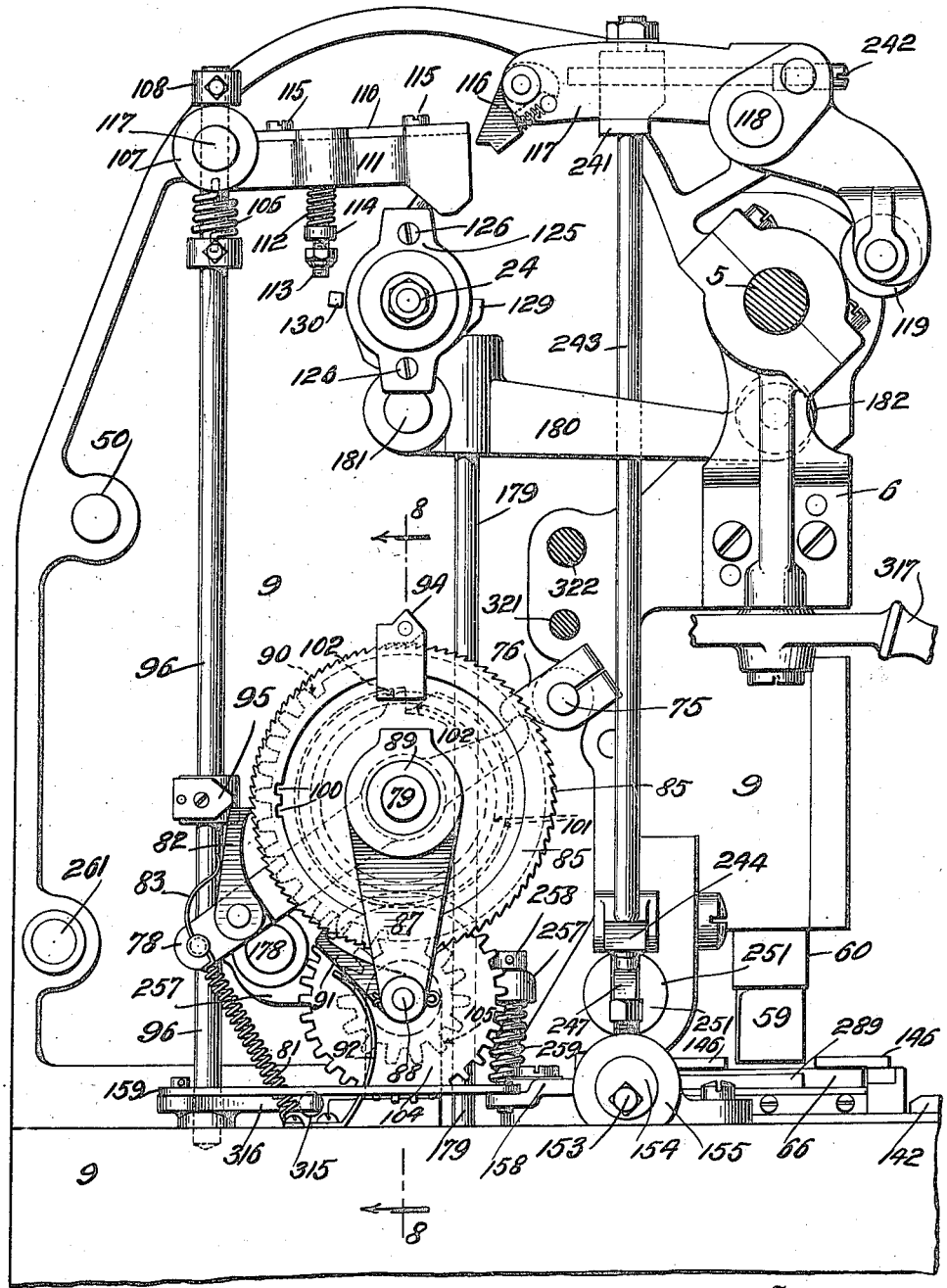
Figure 3 is an end elevation of the opposite end from that shown in Figure 2.

Assuming the parts to be as shown except that there are two removable teeth 94 mounted on the counting ratchet 85 instead of one, as shown in Figure 3, and that a suitably heated blank has just been placed in the machine and the foot treadle 245 depressed to start the machine, the pawl slide is clamped for an instant and then released, the comb slide which carries the blank is released and then the pneumatic action causes the clamping mechanism 146 to tighten by overcoming the action of the pawl 231 and allowing the springs 304 to act freely through the rod 301 and connected bell crank levers 299, and at the same time the pawl 231 is brought over against the fixed cam 234, under the tension of the spring 218 which turns the shaft 200, through the agency of the lever 210 and continuing under the pneumatic pressure, the slide 140 reaches the limit of its movement and impinges against the screw 153 so as to shift the lever 158 and its connected parts so as to throw the shaft 96 about its axis and thereby cause the pin 28 to disengage the projection 20 and thereby permit the cam shafts 15 and 79 to turn through substantially three-tenths of a revolution under the influence of the main shaft 5 which runs continuously. The cams are so arranged and timed that the pawling slide is released immediately after the carriage reaches the end location just above mentioned, and while the carriage is so shifted the pawl 271 is raised and its carriage 272 is placed so that the block 279 engages the stop 287. The pawling rocker 244 is then given one oscillation and feeds the slide one large tooth and then the cutter 59$^a$ has its controlling mechanism so placed that it descends and cuts two guard teeth and meanwhile the clamping device runs from the main shaft 5, clamps the comb slide and the corresponding clamp 223, clamps the pawling slide so that the blank is firmly held in a stationary position while the cutter acts. As this is true of all the operations of all the cutters, this feature will not be repeated but will be understood when the operations of these cutters is explained. Immediately after the first guard teeth have been cut by the cutter 59$^a$ the cams 55$^a$ and 46$^a$ are turned so as to make this cutter inoperative and the adjacent cams 55$^b$, 46$^b$, 55$^c$ and 46$^c$ operative and the knives 59$^b$ and 59$^c$ by these cams operate successively in the manner described to cut coarse teeth. Simultaneously with this the gear 286 acts to shift the small interrupted gear 285 so that the head 279 is clear of the stop 287 and the head 280 is brought into engagement with this stop and of course, the comb slide is correspondingly shifted so that the cutters 59$^b$ and 59$^c$ will be in right relation to the blank with regard to the cut 59$^{aa}$.

After these two cutters have acted successively, as they do, they continue until all the coarse teeth are cut and meanwhile the cam shafts are idle, except for the time of cutting the last coarse tooth, because the projection 20 rests against the stop 28. After each cut of the knife 59$^c$ the pawling mechanism shifts the slide the space of one tooth of the rack 148. Each time the cutter 59$^b$ operates the counting mechanism is operated through the shaft 75, tooth 76, ratchet 82 and connected mechanism and this continues until a movable tooth 94, which has been set at the desired position, shifts the shaft 96, as above described. When this occurs, the pin 28 is withdrawn from the projection 20 and then the cam shafts shift so as to throw the cams 55$^b$ to 46$^c$ out of operation and the cams 55$^d$, 46$^d$, 55$^e$ and 46$^e$ into operation to provide for the cutting of the fine teeth. At the same time the cam shaft 79 has acted through the interrupted gear 286 to turn the small interrupted gear 285 so that the block 281 is against the stop 287 which causes a slight backward shifting by the slide 140 for the purpose of getting the knives or cutters 59$^d$ and 59$^e$ into their proper positions with regard to the last cut 59$^{cc}$ which has been made in the blank.

The knives or cutters 59$^d$ and 59$^e$ are then operated alternately and the comb slide is clamped and unclamped and shifted accordingly and so is the pawl slide and the pawling mechanism operates with the pawl control so set as to feed every fine tooth, and these fine teeth are cut until the next to the last fine tooth has been cut by the knife 59$^d$ and then the tooth 94 engages the corresponding tooth 95 and shifts the shaft 96 above described, so as to cause the projection 20 to disengage the projection 27 and then the cam shafts again shift so as to take the cutters 59$^d$ and 59$^e$ out of operation after cutting the last fine tooth with the last cut made by the knife 59$^d$.

After the last fine tooth has been cut, as above specified, the pawl slide is clamped, the final guard teeth are cut by the cutter 59$^f$, but this does not occur until the intermittent motion has been shifted by the block 282 so that the same is brought against the stop 287 and the comb slide is shifted backwards to correspond so that this knife will act in right relation to the last cut 59$^{dd}$ of the blank 66 and then the cutting is completed. As soon as the cutting is completed the pawl slide is clamped, the comb slide is clamped through the rod 164 as above set forth and the comb clamp is released through the pawl 231 pressing against the rack 232 and thereby causing the springs 304 to be pressed as above described power, for this purpose being derived from the cam 207. The lever 263 actuated by the cam 207 lifts the pawl 271 from the rack 148 and then by its further motion moves the carriage 272 into its initial position. The intermittent gear brings the block 279 against the stop 287 and the operator then removes the cut blank and substitutes a hot blank and again starts the machine on its cycle of operations, as above described. As soon as the last tooth has been cut, the cam shafts continue their revolutions a slight amount so as to bring the counting mechanism back to its initial position through the projection 102 which drives the projection 103 of the ratchet wheel 84, and of course, the projection 20 is stopped by the pin 26 which, was its initial starting point. As the shaft connected with this pin cooperates with a cam with ten lobes and the gear ratio between the cam 5 and the cam shafts is such that the former shaft is driven ten times as fast as the latter shafts, it is obvious that the cam shafts are always brought to rest with a proper relation with regard to the main shaft so that all cams always operate in proper time one with regard to another.

If a comb with coarse teeth is to be cut the apparatus has to be changed as follows: The pin 27 must be withdrawn, the tooth 136 of the cam 46$^c$ must be projected as described, the cam 261 must be shifted so as to be inoperative by turning the eccentric 263, and a tooth 94 must be removed from the ratchet 84. Also, it is preferable to have a rack bar 148 with all course teeth but this is not necessary if two fine teeth cover the same space as one coarse tooth. It is preferable to change racks so as to save the wear of the pawl 271.

While I have shown and described one embodiment of my invention, it is obvious that it is not restricted thereto, but is broad enough to cover all structures that come within the scope of the annexed claims.

What I claim is:—

1. In a machine of the class described, a series of successively acting cutters for cutting more than one kind of teeth and means for mounting the cutters in fixed guides, and means for driving each cutter with a reciprocating movement along an axis, a reciprocating comb slide and means for mounting the same and means for driving the same so that the cutters may operate successively to make suitable, cooperative incisions and automatically vary to form said different teeth in a blank carried by the comb slide.

2. In a machine of the class described, a series of successively operating cutters for cutting more than one kind of teeth, means for mounting said cutters in fixed guides so that they have a reciprocating movement in a single plane only, a comb slide and means for mounting, guiding and driving the same so that it will have a reciprocating movement in a right line only which will compensate automatically for the different kinds of teeth cut by the cutters.

3. In a machine of the class described, a series of successively acting cutters adapted to cut comb teeth of more than one kind with a reciprocating movement in a single plane only, fixed guides for said cutters, a comb slide adapted to carry a comb blank, means for guiding the slide so that it will reciprocate in a right line and have no other motion and means for moving the slide so that proper incisions will always be made by the successively acting cutters, whereby the comb blank is cut so as to produce two combs with more than one kind of teeth.

4. In a machine of the class described, a series of cutters which are adapted to cut the teeth of a comb with more than one kind of teeth with a reciprocating movement in a single plane only, fixed guides for said cutters, a comb slide and means for guiding the same so that it will have a reciprocating motion in a right line only and means for feeding the slide so that a blank carried thereby will have proper comb teeth of more than one kind cut by the cutters.

5. In a machine of the class described, a series of cutters adapted to cut more than one kind of comb teeth and means for driving the same with a reciprocating motion in a single plane only, fixed guides for said cutters, a comb slide and guiding means for said slide so that it moves with a reciprocating motion in a right line only, means for moving the slide so that the cutters will properly cut comb teeth of more than one kind in a blank carried by the slide and means for clamping the blank to the slide, whereby it may be securely held fixedly on the comb slide while the cutters are operating.

6. In a machine of the class described, a series of successively operating cutters arranged so as to cut the guard teeth of a comb and the coarse teeth of a comb and the fine teeth of a comb, all of these cutters having a reciprocating movement only, fixed guides for said cutters, a comb slide and means for guiding the same so that it can move with a reciprocating motion only, means for feeding the slide, first in one direction and then in the other so that a guard tooth is first cut, then the coarse teeth, the fine teeth and finally a guard tooth and means for clamping a blank to the comb slide while said cutting is taking place.

7. In a machine of the class described, a series of cutters adapted to cut guard teeth and coarse teeth in a comb, said cutters being in line so as to cut a blank that has a reciprocating motion only, fixed guides for said cutters, means for carrying the blank with a reciprocating motion, means for moving the blank back and forth so that the comb teeth will be cut true and means for clamping the comb while the teeth are being cut.

8. In a machine of the class described, a series of cutters adapted to cut more than one kind of teeth in a comb, fixed guides for said cutters, a comb carrying slide with a reciprocating motion only adapted to automatically carry a blank for the cutters to operate on when cutting such teeth and means for stopping the machine at any time during the operation of the cutters.

9. In a machine of the class described, a series of successively operating cutters for automatically cutting comb teeth, said cutters being adapted to cut end teeth, coarse teeth, and fine teeth, fixed guides for said cutters, a comb slide adapted to carry a comb blank under said cutters so that the cutters may operate on the blank, means for guiding the slide carrying the blank, means for automatically moving the slide carrying the blank so that the cutters will always make proper incisions in the blank and means for eliminating the fine teeth, cutters and means for changing the movement of the slide to correspond so that the machine may be made to cut a comb with coarse teeth only.

10. In a machine of the class described, a series of successively acting cutters, fixed guides for said cutters and means for driving said cutters successively so that only one operates at a time, said cutters being so arranged and disposed that two are adapted to cut guard teeth, two are adapted to cut coarse teeth, and two are adapted to cut fine teeth, means for carrying a blank in right relation to said cutters, whereby proper incisions are always made in the blank and means for shifting said cutters into and out of operation so that first a guard tooth is cut, next coarse teeth and next a guard tooth or fine teeth, according to the setting of the machine.

11. In a machine of the class described, a series of reciprocating cutters adapted to automatically cut guard teeth, coarse teeth and fine teeth in a comb, blank fixed guides for said cutters, a comb slide adapted to carry this blank in right relation to said cutters, automatic means for moving the slide under the cutters and means for rendering the cutters inoperative and immovable and clear of the blank while the comb slide continues its travel without interruption.

12. In a machine of the class described, a series of cutters for cutting comb teeth, a comb slide for carrying a blank so that said cutters can operate on the same and a counting mechanism for determining the number of teeth to be cut by the cutters.

13. In a machine of the class described, a series of reciprocating cutters, a reciprocating comb slide and means for mounting the same and a counting mechanism connected to the cutters and the comb slide so that any predetermined number of teeth may be cut by the machine according to the setting of the counting mechanism.

14. In a machine of the class described, a series of cutters adapted to cut comb teeth, a counting mechanism for determining the number of teeth to be cut by the cutters and connecting mechanism, whereby the counting mechanism and cutting mechanism will cooperate properly when the machine is in use.

15. In a machine of the class described, a cutting mechanism and means for mounting the same, a counting mechanism and means for mounting the same and connections between the cutting mechanism and the counting mechanism so that the two will function together according to the number of teeth to be cut when the machine is in operation.

16. In a machine of the class described, a comb slide, means for mounting the same so that it has a reciprocating motion in a right line only, means for driving the same, a counting mechanism and means connecting the counting and driving mechanism so that the slide will always be governed by the counting mechanism when shifting a blank between cutting operations.

17. In a machine of the class described, a cutting mechanism, a comb slide adapted to carry a comb blank in connection with said cutting mechanism, a counting mechanism with movable members which may be set at the volition of the operator according to the number of teeth to be cut by the machine.

18. In a machine of the class described, a set of successively acting cutters adapted to cut different kinds of teeth and means for mounting the same, a comb slide and means for mounting the same so that it will carry a comb blank in a proper position for the action of the cutters and a counting mechanism connected to the cutting mechanism and the slide and provided with movable members which may be set at the volition of the operator of the machine so as to determine the number and character of teeth cut by the machine.

19. In a machine of the class described, a set of successively acting cutters adapted to cut different kinds of teeth and means for mounting the same, a comb slide and means for mounting the same so that it will carry a comb blank in a proper position for the action of the cutters and a counting mechanism connected to the cutting mechanism and the slide which may be set at the volition of the operator of the machine so as to determine the number and character of teeth cut by the machine.

20. In a machine of the class described, a series of cutters adapted to cut different kinds of comb teeth and means for mounting the same, means for driving the same, a comb slide adapted to bear a comb blank in proper relation to said cutters and a counting mechanism connected to the slide mechanism and to the cutter mechanism with means thereon which may be set so as to determine the number and kinds of teeth to be cut by the machine and means for setting the apparatus at its initial position upon the completion of the cutting operations on one blank regardless of the number of teeth cut in the blank.

21. In a machine of the class described, a series of cutters adapted to cut comb teeth of different sizes and fixed means for mounting the same, and means automatically acting for driving said cutters at appropriate times, a reciprocating slide adapted to carry a comb blank in proper relation to the cutters, a rack on said slide, a pawl adapted to engage said rack, means for mounting the pawl and automatic means for imparting a movement to the mounting means so that the pawl will move the rack and thereby cause the blank to be placed in proper relation to the cutting mechanism.

22. In a machine of the class described, a set of automatic successively acting cutters adapted to cut the different sized teeth of a comb, fixed guides for said cutters, a slide adapted to carry a blank in proper relation to said cutters and means for mounting the same, a rack attached to said slide, a pawl adapted to engage said rack, a carriage carrying said pawl a slide carrying said carriage, means for reciprocating the slide and means for shifting the carriage so that the blank will be automatically shifted at the proper place and time so as to always be in right relation to the cutters while the cutters are operating.

23. In a machine of the class described, a series of cutters adapted to cut comb teeth, a slide adapted to carry a blank in proper relation to said cutters, a rack secured to said slide, a pawl adapted to engage said rack, means carrying said pawl adapted to have a reciprocating motion and mechanism for changing the length of this reciprocating motion so that the pawl may feed the rack so that it will cut either fine or coarse teeth.

24. In a machine of the class described, a slide adapted to receive a comb blank, a rack secured to said slide, a pawl adapted to engage said rack, a carriage carrying said pawl, a slide carrying said carriage, means for shifting the carriage a predetermined amount on the slide and means for reciprocating the slide.

25. In a machine of the class described, a slide adapted to carry a blank, a rack with coarse and fine teeth secured to said slide, a pawl adapted to engage said rack, a carriage carrying said pawl, a slide carrying said carriage, mechanism for reciprocating said slide, means for changing the shift of the slide so it may move according to whether the pawl is operating on long or short teeth and means for shifting the carriage so as to impart a reverse movement to the said carriage at predetermined intervals.

26. In a machine of the class described, a series of cutters adapted to cut comb teeth and means for mounting the same, a slide adapted to carry a comb blank and means for mounting the same, means for drawing the slide in one direction, a rack and attendant mechanism for forcing the slide in the opposite direction, a pawl engaging said rack, a carriage in which said pawl is mounted, a slide carrying said carriage, means for reciprocating the slide, means for shifting the carriage and means for clamping the slide during predetermined times in each cycle of the apparatus.

27. In a machine of the class described, a series of cuttters adapted to cut comb teeth and means for mounting the same, means for driving the same, a reciprocating comb slide adapted to carry a comb blank in proper relation to said cutters and means for mounting the same, means for drawing said slide in one direction, a rack and attendant mechanism for drawing the slide in the opposite direction, said attendant mechanism including a pawl, a carriage in which the pawl is mounted, a reciprocating pawling slide on which the carriage is mounted, a stop in said pawling slide, a series of headers mounted in said pawling slide and means for turning said headers at appropriate times so that the carriage is shifted to compensate for different positions of different cutters.

28. In a machine of the class described, a series of cutters adapted to cut comb teeth of more than one size and fixed means for mounting the same, means for driving the same at appropriate times, a comb slide and means for mounting the same, means for driving the comb slide in one direction, a rack connected to said slide, a pawling mechanism connected to said rack and means for clamping the slide while the cutters are operating and releasing the slide when the cutters are not operating so that the slide may be shifted automatically according to the cutter operating and clamped in the proper position.

29. In a machine of the class described, a series of cutters adapted to cut comb teeth of more than one size, fixed means for mounting the same and means for driving the same, a comb slide adapted to carry a blank in right relation to said cutters, means for moving the slide in one direction, a rack fixed to a carrier by said slide and partaking of all its movements and a pawling mechanism engaging said rack, said pawling mechanism including means for driving the same so that the blank will always be in right relation to the operating cutters while the same is making its incisions in the blank.

30. In a machine of the class described, a series of reciprocating cutters adapted to cut comb teeth and fixed means for mounting the same in a row, means for driving said cutters successively, a slide adapted to carry a comb blank in right relation to said cutters, means for clamping the slide while the cutters are operating and releasing the slide when the cutters are not operating, means for moving the slide in one direction and a pawl and rack mechanism for moving the slide in the opposite direction, said pawl and sliding mechanism being provided with means for causing the blank to be shifted so that all incisions by the cutters will be made in proper relation one to another, whereby two combs may be cut from a single blank.

31. In a machine of the class described, a series of cutters adapted to cut comb teeth in a blank, fixed means for mounting the same, fixed means for driving the same, a slide adapted to carry a comb blank in proper relation to said cutters, a rack adapted to feed said slide in one direction, means for moving the slide in the other direction, a pawl for shifting the rack in one direction, means for shifting the pawl so that it will shift the rack and means for elevating the pawl so as to take it out of engagement with the rack whenever the slide is shifted in opposition to the rack and pawl mechanism.

32. In a machine of the class described, a comb slide and means for actuating the same, a strip on said slide adapted to support a blank and means for securing the strip in place, means for clamping a comb blank to the strip, means for shifting the slide in one direction with a continuous motion and means for shifting the slide in the opposite direction with the intermittent and irregular and sometimes reversed motion, whereby the blank carried by the slide may be placed in right relation with the cutting mechanisms.

33. In a machine of the class described, a main shaft and a cam shaft, a comb slide and means for shifting the same, means for clamping the same with two releases, one release being connected to the main shaft and held thereby and one being connected to the cam shaft and controlled thereby so that the slide is released only when both releases cooperate simultaneously.

34. In a machine of the class described, a main shaft, an upper cam shaft and a lower cam shaft, a reciprocating comb slide and means for clamping the same controlled by two spring pressed members, one of said members being connected to said lower cam shaft and also to said main shaft so that this member may release said clamp when actuated from either shaft, a connection between the other member and said lower cam shaft through a cam, a crank pin adapted to cooperate with said cam, a crank supporting said pin, means for pivotally mounting said crank so that the same may swing over a lever connected to said second member and means for depressing said lever abnormally so as to release the crank before the crank pin is shifted by the cam so that the spring may act to cause said second mentioned member to actuate the clamp to hold the slide.

35. In a machine of the class described, a main shaft and two cam shafts driven from the main shaft and mechanism connecting said shafts, a comb slide and means for mounting the same so that the slide may move with a reciprocating motion, a clamp adapted to hold said slide and two spring pressed members controlling said clamp, means connecting one of said spring pressed members with both the main shaft and one of the cam shafts, and two connections between the same cam shaft and the other member so that this member will act to clamp the slide only at the beginning and end of the cycle of operations of the device while the other member will clamp and release the slide several times during the operation of the apparatus.

36. In a machine of the class described, a main shaft and a cam shaft, a plurality of cutters adapted to cut comb teeth of two or more kinds, fixed guides for said cutters, a cam lever connecting each of said cutters with its appropriate cam on the main shaft and means on the cam shaft for withdrawing each connecting lever from all connection with its cutter at the appropriate time so that the cutters may be operated successively according to the desired cycle of the apparatus and different kinds of teeth cut in a blank.

37. In a machine of the class described, a main shaft and a cam shaft, a series of reciprocating cutters of two or more kinds, fixed guides for said cutters, a cam lever for each cutter controlled by said cam shaft and driven by said main shaft so that all cutters may be made inoperative or driven at appropriate times so that the cutters operate successively when cutting a blank and different kinds of teeth cut in a blank.

38. In a machine of the class described, a main shaft and a cam shaft, a series of cutters adapted to cut comb teeth of two or more kinds, fixed guides for said cutters, a series of corresponding cam levers, means on the cam shaft for rendering any of said levers operative or inoperative, means on the main shaft for driving any of said levers and means for simultaneously withdrawing all levers from the main shaft so as to render them inoperative so that the operation of the cutting mechanism will be suspended at any time at the volition of the operator of the machine and different kinds of teeth cut in a blank.

39. In a machine of the class described, a main shaft and a cam shaft, a series of cutters adapted to cut comb teeth in a blank, a cam lever for each cutter, three means on each lever for engaging three cams, one of said means engaging a cam on the main shaft for driving the cutter, one of said means engaging a cam on the cam shaft for holding the lever depressed and out of contact with the cam on the cam shaft and one of said means engaging another cam on the cam shaft for withdrawing the lever from all connection with its cutter so that the cams on the cam shaft control the cutting operation by making or breaking the connection between the cams on the main shaft and the cutters.

40. In a machine of the class described, a series of cutters which are adapted to cut comb teeth, said cutters being arranged in pairs, a holder for supporting each cutter and to which each cutter is secured, a bell crank lever supporting each holder, a spring supporting each bell crank lever and a strong withdrawing spring connected to two adjacent bell crank levers for withdrawing a cutter from the blank after its incision has been made in the blank by the cutter.

41. In a machine of the class described, a series of cutters adapted to cut comb teeth, a counting mechanism for determining the number of teeth to be cut, a holder for each cutter and spring pressed mechanisms supporting the holders and means connecting some of said spring pressed mechanisms with said counting mechanism so that when some of the cutters operate the counting mechanism will operate, but will not operate when other cutters operate.

42. In a machine of the class described, a main shaft and a cam shaft, a series of cams on the main shaft and a series of cams on the cam shaft, a cam lever for each of the cams on the main shaft with means adapted to engage its cam on the main shaft, a second means for engaging two cams on the cam shaft, a spring adapted to press said means against its appropriate cam on the main shaft, reciprocating knives adapted to cut comb teeth, one for each cam on the main shaft, and adapted to be driven by this cam through its appropriate means on the cam lever and against the tension of the supporting spring, a bell crank lever adapted to support each cutter and a spring for supporting said bell crank lever and strong withdrawing springs adapted to withdraw the knives from a blank.

43. In a machine of the class described, a main shaft, two cam shafts and a series of cutters adapted to cut comb teeth of different sizes, fixed guides for said cutters, means for driving each of said cutters successively from the main shaft which are controlled by cams on a cam shaft and mechanism for allowing some of the cutters to operate until a predetermined number of teeth have been cut and then withdrawing these cutters from operation and permitting other cutters to operate until a predetermined number of different sized teeth have been cut.

44. In a machine of the class described, means for cutting comb teeth of different sizes, fixed guides for said cutting means, a comb slide and means for shifting said slide so that it will be in right relations with said cutting means and a clamp for holding the blank on said slide, said clamp being so made and disposed as to clamp the comb blank at all times between the starting of the machine and the last cut and open immediately after the last cut has been taken so that the cut blank may be removed and a new blank substituted.

45. In a machine of the class described, a series of cutters and fixed means for mounting the same so that said cutters may cut comb teeth of two or more sizes in a blank, a slide adapted to carry a blank in right relations to said cutters, a clamp carried by said slide, elastic means for letting said clamp grip an irregular blank and hold the same firmly and means for causing the clamp to grip the blank immediately upon the starting of the cycle of operations of the machine and release the same after the last cut has been made.

46. In a machine of the class described, means for cutting comb teeth of two or more sizes, fixed guides for said cutting means, means for shifting a blank in right relations to said comb teeth and means for clamping said blank to said shifting means at all times during the cutting operations of the machine and releasing said blank immediately upon the finishing of said cutting operations.

47. In a machine of the class described, a plurality of comb tooth cutters for cutting comb teeth of two or more sizes operating in fixed guides and means for automatically controlling the tooth cutting and withdrawing operation of each cutter independently of the others.

48. In a machine of the class described, cutters for cutting comb teeth of two or more sizes, fixed guides for said cutters, cams actuating these cutters, rollers driven by the cams, and levers carrying these rollers provided with means for disengaging the rollers from the cutters and from the cams.

49. In a machine of the class described, means for carrying a comb blank with a reciprocating movement only, a pawl slide moving parallel to the blank carrying means, a pawl adjacent to said slide and means for mounting the same, means for oscillating the same, automatic means for connecting the pawl to the slide so that the slide may be shifted according to its connection with the pawl and means for connecting the slide to the blank carrying means.

50. In a machine of the class described, automatic means for cutting both coarse and fine teeth and means for shifting from coarse to fine teeth, a comb blank carrying means, a pawl and means for mounting the same, means for oscillating the same, sliding means connecting the pawl with the blank carrying means and means for automatically changing the effective stroke of this pawl at the time of changing from coarse to fine teeth.

51. In a machine of the class described, cutters, means for carrying a comb blank, a pawl carriage mounted on a pawl slide and means for giving said carriage a series of longitudinal movements on said pawl slide at desired times to locate the comb blank correctly in relation to the different cutters.

52. In a machine of the class described, cutters, means for carrying a comb blank, a stop, a plurality of adjustable blocks and means for automatically shifting them at intervals to contact in turn with this stop and thereby allow the comb blank to shift in proper relation to the different cutters.

53. In a machine of the class described, cutters, a movable bed for holding a comb blank, means for clamping this bed in a stationary position while the cutters are cutting the comb teeth and means for releasing said bed when it is being moved preparatory for another cut.

54. In a machine of the class described, means for producing a positive pressure, a bed for holding a comb blank, means for moving said bed against this positive pressure, means for clamping said bed between movements and means for releasing said bed during movement and until the bed has come to a complete rest in its new position.

In testimony whereof I have hereunto affixed my signature.

EVARTS G. LOOMIS.